United States Patent
Mongeau

(10) Patent No.: US 9,850,882 B2
(45) Date of Patent: Dec. 26, 2017

(54) WIND TURBINE GENERATOR WITH LOCALIZED AIR GAP CONTROL AND A WIND TURBINE HAVING SUCH A GENERATOR

(75) Inventor: Peter Mongeau, Center Conway, NH (US)

(73) Assignee: Vestas Wind Systems A/S, Aarhus N. (DK)

( * ) Notice: Subject to any disclaimer, the term of this patent is extended or adjusted under 35 U.S.C. 154(b) by 1047 days.

(21) Appl. No.: 14/118,474

(22) PCT Filed: May 21, 2012

(86) PCT No.: PCT/US2012/038809
§ 371 (c)(1),
(2), (4) Date: Jan. 28, 2014

(87) PCT Pub. No.: WO2012/159108
PCT Pub. Date: Nov. 22, 2012

(65) Prior Publication Data
US 2014/0133985 A1    May 15, 2014

Related U.S. Application Data

(60) Provisional application No. 61/487,957, filed on May 19, 2011, provisional application No. 61/508,885, filed on Jul. 18, 2011.

(51) Int. Cl.
*F03D 80/70*    (2016.01)
*F03D 11/00*    (2006.01)
(Continued)

(52) U.S. Cl.
CPC ............ *F03D 11/0008* (2013.01); *F03D 9/25* (2016.05); *F03D 80/70* (2016.05); *F16C 17/02* (2013.01);
(Continued)

(58) Field of Classification Search
CPC .......... F03D 80/70; F16C 17/02; F16C 25/02; F16C 17/03; F16C 17/035; F16C 25/04
(Continued)

(56) References Cited

U.S. PATENT DOCUMENTS 3,994,367 A * 11/1976 Christ ................. F16C 32/0666
184/5
4,019,787 A     4/1977 Jenness
(Continued)

FOREIGN PATENT DOCUMENTS

| WO | 9745651 A1 | 12/1997 |
|---|---|---|
| WO | 0011360 A1 | 3/2000 |
| WO | 2011003482 A2 | 1/2011 |

OTHER PUBLICATIONS

European Patent Office, International Search Report and Written Opinion issued in International application No. PCT/US2012/038809 dated Dec. 11, 2013.

*Primary Examiner* — Kenneth Bomberg
*Assistant Examiner* — Hoon Choi
(74) *Attorney, Agent, or Firm* — Wood Herron & Evans LLP

(57) ABSTRACT

A wind turbine component includes an inner member and an outer member disposed relative to the inner member, wherein the inner and outer members move relative to each other. A plain bearing is coupled to one of the inner or outer member and configured to provide a fluid film for maintaining separation of and facilitating relative movement between the inner and outer members. A position adjustment mechanism is coupled to the one of the inner or outer member for selectively moving the plain bearing. A position controller may be operatively coupled to the position adjustment mechanism for controlling the position of the plain bearing. The wind turbine component may be a wind turbine generator with the inner member and outer member correspond-
(Continued)

ing to one of the stator and rotor assemblies. Methods for controlling the generator are also disclosed.

18 Claims, 14 Drawing Sheets

(51) Int. Cl.
    *F16C 17/02*     (2006.01)
    *F16C 25/02*     (2006.01)
    *H02K 7/08*     (2006.01)
    *H02K 7/18*     (2006.01)
    *H02K 5/167*     (2006.01)
    *F03D 9/25*     (2016.01)

(52) U.S. Cl.
    CPC ........... *F16C 25/02* (2013.01); *H02K 5/1672* (2013.01); *H02K 7/083* (2013.01); *H02K 7/1838* (2013.01); *F16C 2360/31* (2013.01); *H02K 2201/03* (2013.01); *H02K 2213/09* (2013.01); *H02K 2213/12* (2013.01); *Y02E 10/722* (2013.01); *Y02E 10/725* (2013.01)

(58) Field of Classification Search
    USPC ......................................................... 384/154
    See application file for complete search history.

(56) References Cited

U.S. PATENT DOCUMENTS

| | | | | |
|---|---|---|---|---|
| 4,106,824 A | * | 8/1978 | Meystre | F16C 32/0666 384/122 |
| 4,113,325 A | * | 9/1978 | Miller | F16C 32/0666 384/12 |
| 4,310,204 A | * | 1/1982 | Christ | F16C 32/0666 384/106 |
| 4,643,592 A | * | 2/1987 | Lewis | F16C 17/03 384/100 |
| 5,769,545 A | * | 6/1998 | Bently | F16C 32/0644 384/114 |
| 5,772,334 A | | 6/1998 | Parkins et al. | |
| 6,943,478 B2 | * | 9/2005 | Zepp | H02K 7/12 310/191 |
| 7,009,317 B2 | * | 3/2006 | Cronin | H02K 9/19 310/52 |
| 9,297,363 B2 | * | 3/2016 | Guerenbourg | F03D 11/0008 |
| 2010/0045047 A1 | * | 2/2010 | Stiesdal | F03D 1/001 290/55 |

* cited by examiner

WIND TURBINE GENERATOR WITH LOCALIZED AIR GAP CONTROL AND A WIND TURBINE HAVING SUCH A GENERATOR

TECHNICAL FIELD

This application relates generally to wind turbines and, more particularly, to a generator for a wind turbine having localized air gap control and a wind turbine having such a generator.

BACKGROUND

Wind turbines are used to produce electrical energy using a renewable resource and without combusting a fossil fuel. Generally, a wind turbine converts kinetic energy from the wind into mechanical energy and then subsequently converts the mechanical energy into electrical power. A horizontal-axis wind turbine includes a tower, a nacelle located at the apex of the tower, and a rotor that is supported in the nacelle. The rotor is coupled with a generator for converting the kinetic energy of the blades to electrical energy.

Traditionally, wind turbines include a main drive shaft extending from the rotor hub and into the nacelle which rotates with rotation of the rotor. The main drive shaft is operatively coupled to one or more gear stages, which may be in the form of a gear box, to produce a more suitable mechanical input to a generator also located in the nacelle. The gear box relies on various gear arrangements to provide speed and torque conversions from the rotation of the rotor and main drive shaft to the rotation of a secondary drive shaft that operates as an input to the generator. For example, the gear box may transform the relatively low rotational speed of the main drive shaft (e.g., 5 to 25 revolutions per minute (rpm)) to a relatively high rotational speed (e.g., 3,000 rpm or higher) of the secondary drive shaft which is mechanically coupled to the generator.

The generator typically includes a stator assembly and a rotor assembly concentrically disposed relative to each other within an outer housing. The stator assembly is generally fixed and stationary and includes a plurality of coils, while the rotor assembly includes a plurality of magnets and is configured to rotate relative to the stator assembly. The magnets and coils are separated from each other across a radial air gap through which the magnetic field generated by the magnets must pass. The stator assembly and rotor assembly of the generator cooperate to convert the mechanical energy received from the rotor into electrical energy so that the kinetic energy of the wind is harnessed for power generation. Specifically, the movement of the magnets of the rotor assembly past the stationary coils of the stator assembly induces an electrical current in the coils according to the precepts of Faraday's Law.

While these conventional generator designs work for their intended purpose, there has been growing interest in wind turbine drive train systems that obviate the need for gear stages. Such wind turbines are referred to as direct drive wind turbines and are characterized by having the wind turbine blades and hub mounted directly to a low-speed generator. To account for the direct drive generator's slower rotational speed, however, the diameter of the generator's rotor is often increased, for example being 5 m or more in diameter in some applications. The increased diameter increases the localized velocity of the magnets (which scales linearly with the radial position of the magnets) and further provides increased space for additional magnets and coils. Thus, while a direct drive generator rotates more slowly, the increased radial dimension of the generator provides an offset for maintaining sufficient power production. The large radial extent of direct drive generators, however, present certain design challenges for wind turbine manufacturers, especially as the size and power production of wind turbines continue to increase.

In this regard, it is generally known that the passage of the magnetic field produced by the magnets of the rotor assembly to the coils of the stator assembly depends to some degree on the width and uniformity of the air gap maintained therebetween. Thus, it is desirable and a primary design criteria for generator designers to maintain a substantially uniform (e.g., within an acceptable tolerance band) and optimized air gap between the stator and rotor assemblies. More particularly, on the one hand, the smaller the air gap, the stronger the magnetic field that interacts with the stator coils and the more current is induced therein due to passage of the magnets (i.e., the more electricity is produced). On the other hand, however, contact between the stator and rotor assemblies of the generator can do significant damage to the generator and should be avoided. Accordingly, the various forces and non-uniformities that act on the wind turbine, and ultimately the generator, must be accommodated in a manner that does not significantly disturb the air gap between the stator and rotor assemblies or allow the stator and rotor assemblies to contact each other. Thus, there are counter balancing considerations when establishing the air gap width in the generator.

From a broad perspective, these forces and non-uniformities acting on a generator may generally be divided into internal disturbances and external disturbances. Internal disturbances focus on the aspects of the generator itself that may affect the consistency of the air gap. External disturbances, on the other hand, focus on the effects that aspects of the external environment have on the air gap. Considering first internal disturbances, a primary contributor to internal disturbances is the generator's bearing arrangement. For example, the relative movement between the stator and rotor assemblies is generally established by roller element bearings. If, however, the roller elements are out of round or otherwise irregular or the bearing races are out of round or otherwise irregular, the consistency of the air gap may be negatively affected. The generator is also under the influence of magnetic loads that ultimately get transferred to the structural aspects of the wind turbine, such as the tower. These magnetic loads must be accommodated in some manner that attempts to maintain the consistency of the air gap. In conventional designs, this is typically achieved by making the structural aspects of the generator very stiff so as to suppress significant deflections under the magnetic loads imposed thereon.

While roller element bearings generally work well on a relatively small scale (i.e., the air gap may be maintained within an acceptable tolerance band), roller element bearings do not scale upwardly well. In this regard, it can become difficult to maintain acceptable tolerance values for roller element bearings larger than about 1.5 meters in diameter using, for example, conventional manufacturing techniques. In other words, it is difficult to maintain substantially perfect roundness and tolerances of the roller element bearings on a relatively large scale. As noted above, these imperfections in the roller element bearings may have a negative impact on maintaining a consistent air gap between the stator and rotor assemblies. Thus, for large scale and large load roller element bearing applications, high precision manufacturing techniques are generally required to make the designs more feasible. Of course, this increases the time, labor and cost associated with the manufacture of the generator. For direct drive wind turbine generators, which as explained above are generally large scale applications, the use of roller element bearing assemblies represents a major design challenge that may ultimately limit generator size and output.

As to external disturbances, the wind turbine rotor (i.e., the central hub and blades) is subject to a wide range of loading, including asymmetric, transient loading resulting from, for example, turbulence, wind gusts, vertical and horizontal wind shear, and other wind conditions, as well as loading from inertial and gravitational forces. In conventional drive trains having gear stages, many of these external disturbances become dampened or dissipated before reaching the generator. Thus, their impact is somewhat mitigated in conventional gear stage generator designs. In direct drive wind turbines, however, these forces ultimately get transferred to the wind turbine tower through the generator itself, thus subjecting the generator components to potential deflection and perturbations along the load path to the tower. To prevent or reduce the deflection of the generator components, and thus possible disruption of the air gap between the stator and rotor assemblies, the stator and rotor assemblies are made stiff, i.e., having significant structures associated therewith so as to withstand the forces being transmitted therethrough without significant deflection. This stiff structural requirement results in costly and heavy generator designs.

Another external aspect of some concern is the effect of thermal discursions on the consistency of the air gap. In this regard, wind turbines operate in a host of environments that experience ambient temperature changes on the order of 40-50° C. In some applications, the thermal expansions/contractions that occur due to the thermal variations may be on the order of the desired design tolerances of the generator (e.g., the tolerance band of the air gap). Thus, current designs generally provide an increased air gap width to allow for this thermal expansion/contraction of the generator components.

In addition to the above, there are additional disadvantages to current direct drive generator designs. More particularly, in view of the internal and external disturbances imposed on a typical wind turbine generator, current designs provide for an air gap width of about 5-10 mm between the stator and rotor assemblies. To enhance energy production, the magnetic flux passing through the air gap should be maximized, which suggests using permanent magnets in the rotor assembly as opposed to electromagnets, since permanent magnets generally produce stronger magnetic fields as compared to their electromagnet counterpart. Moreover, there is uncertainty whether electromagnets can generate sufficiently strong magnetic fields that can pass through air gaps on the order of 5-10 mm (again a range generally needed to accommodate the internal and external disturbances without stator/rotor contact) and result in sufficient power production. It is contemplated, for example, that much smaller air gaps would generally be required to make electromagnetic induced power production more feasible and desirable. Those smaller air gaps simply cannot be reliably obtained at this time using conventional generator designs.

While permanent magnets are attractive for direct drive generator designs, permanent magnets have certain drawbacks. For example, many permanent magnets are rare-earth permanent magnets composed of an alloy containing one or more rare earth (lanthanide) elements, such as neodymium or samarium, that are ferromagnetic metals. Representative alloys suitable for the permanent magnetic material of permanent magnets include, but are not limited to, a samarium alloy containing cobalt ($SmCo_5$) and a neodymium alloy containing iron and boron ($Nd_2Fe_{14}B$). However, rare earth magnetic materials are not particularly plentiful and a significant amount of material is required for direct drive generator designs (e.g., as much as 1,000 kg of finished magnets for each mega watt (MW) of power output) due to the large size and number of magnets needed to compensate for the slower rotational speeds. These circumstances do not lend themselves to economically advantageous positions for manufacturers. Additionally, it is anticipated that rare earth magnets will become a major supply challenge for direct drive generator manufacturers.

Accordingly, there is a need for improved generator designs that address these and other disadvantages of conventional generator designs. More particularly, there is a need for a direct drive wind turbine generator design that provides enhanced control of the air gap in view of the potential internal and external disturbances imposed on the wind turbine, and wind turbine generator more particularly. Enhanced control of the air gap will provide a significantly greater number of design options that have been foreclosed in conventional generator designs.

SUMMARY

Embodiments in accordance with the invention address these and other deficiencies in conventional wind turbine generators. In one embodiment, a wind turbine component includes an inner member and an outer member disposed relative to the inner member, wherein the inner and outer members move relative to each other. A plain bearing is coupled to one of the inner or outer member and configured to provide a fluid film for maintaining separation of and facilitating relative movement between the inner and outer members. A position adjustment mechanism is coupled to the one of the inner or outer member for selectively moving the plain bearing. A position controller may be operatively coupled to the position adjustment mechanism for controlling the position of the plain bearing.

In one embodiment, the one of the inner or outer member is formed by a plurality of member segments. Additionally, at least one of the member segments includes a plain bearing. In an exemplary embodiment, each of the member segments includes a plain bearing. At least one of the member segments includes a position adjustment mechanism coupled thereto. Again in an exemplary embodiment, each of the member segments includes a position adjustment mechanism. Each of the position adjustment mechanisms may be independently controllable by the position controller. Additionally, the member segments having a position adjustment mechanism may further include a pivot support mechanism for guiding the movement of the plain bearing.

In an exemplary embodiment, the plain bearing includes a hydrostatic bearing having at least one cavity confronting the other of the inner or outer member. The cavity is coupled to a fluid supply and a pressure source for supplying a pressurized fluid that forms the fluid film between the inner and outer members. More particularly, in one embodiment, the hydrostatic bearing includes at least one pad coupled to the one of the inner and outer member, wherein the cavity is formed in a surface of the at least one pad confronting the other of the inner or outer member. In one embodiment, the at least one pad may be pivotally coupled to the one of the inner or outer member. A bearing controller may be operatively coupled to the plain bearing for controlling the bearing. In this regard, the bearing controller may be operatively coupled to the pressure source for controlling at least one of the pressure of the fluid film and the flow of fluid to the at least one cavity of the hydrostatic bearing.

In one embodiment, the position adjustment mechanism includes a first active control member capable of being controlled by the position controller, and a second passive member, which may in one embodiment be configured in series with the first member. The first active control member may include an actuator, such as a hydraulic, pneumatic, or other linear actuator. The second passive member may include a compliant member capable of elastic deformations and include at least one of a spring, bladder or rubber block. The second member may further include a damping element.

The wind turbine component may include an interior space disposed between the inner and outer members and in communication with the fluid film. In one aspect of the invention, the wind turbine component may further include a cooling system for cooling the component. In one embodiment, the cooling system may include a liquid coolant at least partially filling the interior space and in open communication with at least one of the inner or outer member, a pump in communication with the interior space, and a heat exchanger in communication with the pump. The pump is configured to circulate the liquid coolant through the heat exchanger and thereby transfer heat absorbed by the liquid coolant away from the wind turbine component. In one embodiment, the liquid coolant partially fills the interior space and the cooling system further includes at least one spray head for spraying the liquid coolant on a portion of the wind turbine component. In one aspect of the invention, the liquid coolant and the fluid that forms the liquid film are the same. Thus, the use of a plain bearing may lead to additional advantages.

In one embodiment, the wind turbine component includes a wind turbine generator wherein the inner member includes one of a stator assembly or a rotor assembly of the generator and the other member includes the other of the stator assembly or rotor assembly of the generator. In one embodiment, the inner member includes the stator assembly and the other member includes the rotor assembly. Additionally, the plain bearing may be coupled to the stator assembly and the position adjustment mechanism may be coupled to the stator assembly for moving the stator assembly. In an alternative embodiment, the wind turbine component may be a bearing assembly, such as a main bearing assembly or a blade bearing assembly. One embodiment of the invention further includes a wind turbine having a wind turbine component or a wind turbine generator as described above. The wind turbine may be a direct drive wind turbine.

In another embodiment of the invention, a wind turbine generator includes a support, a stator assembly, and a rotor assembly wherein one of the stator or rotor assembly is movably mounted to the support and wherein the stator and rotor assemblies are configured to move relative to each other to produce electricity. A plain bearing is coupled to one of the stator or rotor assembly and configured to provide a fluid film for maintaining separation of and facilitating relative movement between the stator and rotor assemblies. The fluid film establishes an air gap between the stator and rotor assemblies. A position adjustment mechanism is coupled to the support and further coupled to the one of the stator or rotor assembly movably mounted and configured to selectively move the one of the stator or rotor assembly. A position controller may be coupled to the position adjustment mechanism for controlling the position of the one of the stator or rotor assembly, thereby controlling the air gap between the two assemblies.

In one embodiment, the plain bearing may be coupled to the one of the stator or rotor assembly that is movably mounted to the support. Additionally, the one of the stator or rotor assembly that is movably mounted to the support may include a plurality of assembly segments that collectively define the one of the stator or rotor assembly. In one embodiment, each assembly segment includes a segment frame and a segment envelope carrying a magnetic member. Each segment may be coupled to a position adjustment mechanism and include a plain bearing. The position controller is capable of independently controlling each of the position adjustment mechanisms associated with the assembly segments. Furthermore, each segment may include a pivot support mechanism for guiding the movement of the segment.

In one embodiment, the plain bearing is a hydrostatic bearing including at least one pad having a cavity operatively coupled to a fluid supply and a pressure source for supplying a pressurized fluid that forms the fluid film between the stator or rotor assemblies. There may be a plurality of pads and at least one, and perhaps all, of the pads are pivotally coupled to the stator or rotor assembly. A bearing controller may control aspects of the plain bearing, including the pressure of the fluid film or the flow of fluid to the cavity of the pads.

The position adjustment mechanism includes a first active control member capable of being controlled by the position controller, and a second passive member, which may in one embodiment be configured in series with the first member. The first active control member may include an actuator, such as a hydraulic, pneumatic, or other linear actuator. The second passive member may include a compliant member capable of elastic deformations and include at least one of a spring, bladder or rubber block. The second member may further include a damping element.

The wind turbine generator may also include a cooling system in accordance with that described above. Embodiments of the invention also include a wind turbine having a generator as described above and herein. The wind turbine may be a direct drive wind turbine.

In a further embodiment, a method of operating a wind turbine generator having a stator assembly, a rotor assembly, and a fluid film configured to maintain separation of and facilitate relative movement between the stator or rotor assemblies includes monitoring at least one parameter of the fluid film between the stator and rotor assemblies and transmitting information of the parameter to a controller; using the controller to compare information on the parameter to a threshold criteria stored in the controller; and altering the operational state of the generator when information of the parameter meets the threshold criteria.

In one embodiment, the parameter being monitored includes the pressure of the fluid film. In an alternative embodiment, the parameter being monitored comprises the fluid film thickness. In a further embodiment, one of the stator or rotor assembly is coupled to a position adjustment mechanism configured to selectively move one of the stator or rotor assembly, the method further comprising monitoring at least one parameter of the position adjustment mechanism and transmitting information on that parameter to a controller; using the controller to compare the information on the parameter to a threshold criteria stored in the controller; and altering the operational state of the generator when the information on the parameter meets the threshold criteria.

In one embodiment, altering the operational state of the generator includes changing the pressure of the fluid film. Alternatively, altering the operational state includes changing the flow rate of fluid to the fluid film. Still further, altering the operational state of the generator includes selectively moving at least a portion of one of the stator or rotor assembly. In one embodiment, the one of the stator or rotor assembly being moved is formed from a plurality of assembly segments, wherein the step of moving at least a portion of the stator or rotor assembly further comprises moving at least one of the assembly segments. In one embodiment, the method comprises independently controlling the movement of the assembly segments. Additionally or alternatively, the method may include altering the dynamic state of the wind turbine. This may include, in one embodiment, at least one of yawing the nacelle relative to the tower and pitching the blades of the wind turbine.

In still a further embodiment, a method of operating a wind turbine having a wind turbine generator with a stator assembly, a rotor assembly, and a fluid film configured to maintain separation of and facilitate relative movement between the stator and rotor assemblies includes monitoring at least one parameter of the wind turbine and transmitting information on the parameter to the controller; using the controller to estimate an anticipated load on the generator based on the monitoring step; using the controller to determine set point data for the generator configured to accommodate the anticipated load on the generator; and configuring the generator to operate in a state determined by the set point data.

In one embodiment, the wind turbine parameter includes at least one of wind speed, rotor speed, turbine output, ambient temperature and pressure, and blade pitch. In one embodiment, the step of estimating the anticipated load on the generator includes storing a look up table on the controller correlating generator loads to wind turbine parameters; and accessing the look up table to estimate the load on the generator. In one embodiment, the step of determining the set point data for the generator includes storing a look up table on the controller correlating generator configuration data to anticipated load; and accessing the look up table to determine the set point data for the generator. In one embodiment, the set point data may include at least one of fluid film pressure, fluid film flow rate, and position of at least a portion of one of the stator or rotor assembly.

Accordingly, in one embodiment, the step of configuring the generator to operate in a state determined by the set point data includes changing the fluid pressure of the fluid film. Alternatively, the step may include changing the flow rate of fluid to the fluid film. Still further, the step may include changing the position of at least one of the stator or rotor assembly. In one embodiment, one of the stator or rotor assembly whose position is being changed is formed from a plurality of assembly segments, wherein the step of changing position of at least a portion of one of the stator or rotor assembly further comprises changing the position of at least one of the assembly segments. The method may further include independently controlling the position of the assembly segments.

In still a further aspect, the method may further include monitoring at least one parameter of the fluid film and transmitting information on that parameter to a controller; using the controller to compare the information on the parameter to a threshold criteria stored in the controller; and modifying the set point data when the information on the parameter meets the threshold criteria.

In yet another embodiment, a method of cooling a wind turbine component having an inner member, an outer member, and a plain bearing configured to provide a fluid film for maintaining separation of and facilitating relative movement between the inner and outer members includes using the fluid film as a liquid coolant for cooling the wind turbine component. In one embodiment, the wind turbine component includes an interior space in communication with the fluid film which is substantially completely filled with the fluid that forms the film. The fluid is circulated through a heat exchanger to transfer heat away from the wind turbine component.

In an alternative embodiment, the fluid that forms the film only partially fills the interior space. In this case, the method further comprises allowing the fluid to drain toward a bottom of the interior space; and circulating the fluid collected at the bottom of the interior space through a heat exchanger to transfer heat away from the wind turbine. In one embodiment, the method includes spraying the fluid on a portion of the wind turbine component and allowing the sprayed fluid to drain toward the bottom of the interior space. The fluid circulated through the heat exchanger may be reintroduced into the fluid film.

In one embodiment, the wind turbine component is a wind turbine generator wherein the inner member includes one of a stator assembly and a rotor assembly of the generator and the outer member includes the other of the stator or rotor assembly. In an exemplary embodiment, the inner member includes the stator assembly and the outer member includes the rotor assembly.

A method of maintaining a substantially constant gap between an inner member and an outer member of a wind turbine component under load comprises movably supporting one of the inner or outer member to a foundation using a position adjustment mechanism having an active control aspect; supporting the other of the inner or outer member on the one of the inner or outer member using a fluid film therebetween; and moving the one of the inner or outer member using the position adjustment mechanism so as to maintain the gap between the inner and outer member substantially constant.

In one embodiment, the one of the inner or outer member is formed by a plurality of member segments at least one of which having a position adjustment mechanism, wherein the step of moving the one of the inner or outer member further comprises moving at least one of the member segments using a position adjustment mechanism. The method may further include independently controlling the movement of the plurality of member segments having a position adjustment mechanism. For example, according to the method, one member segment may be moved in a manner that is different from another member segment. The active control aspect is configured to respond to a first class of loads characterized by a relatively small frequency and relatively large amplitude. For example, the first class disturbances may have a frequency of less than about 1 Hz and an amplitude greater than about 1 mm.

The method may further comprise supporting the one of the inner or outer member to the foundation using a position adjustment mechanism having a passive control aspect. The passive aspect may be configured to respond to a second class of loads characterized by a relatively high frequency and a relatively small amplitude. For example, the second class loads may have a frequency greater than about 1 Hz and an amplitude less than about 1 mm. The active and passive aspects make it possible to accommodate both the first class and second class loads and thereby maintain the gap between the inner and outer members substantially constant.

A method of damping structural vibration in a wind turbine for affecting resonant behavior of a wind turbine component includes obtaining a bearing assembly having an inner member and an outer member disposed relative to the inner member, wherein the inner and outer members are configured to move relative to each other, wherein one of the inner or outer member is supported by a position adjustment mechanism having an active control aspect, and the other of the inner or outer member is supported on the one of the inner or outer member using a fluid film; sensing a vibration in the wind turbine component; using a controller to determine if the sensed vibration includes a characteristic that meets a threshold criteria stored in the controller; and moving the one of the inner or outer member using the position adjustment mechanism to impose a force that dampens the vibration when the characteristic meets the threshold criteria. The bearing assembly may be a generator bearing assembly, a main bearing assembly, or a blade bearing assembly. Additionally, the sensed vibration may be an edgewise vibration of the one or more of the wind turbine blades.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention.

DETAILED DESCRIPTION

Figure 1:
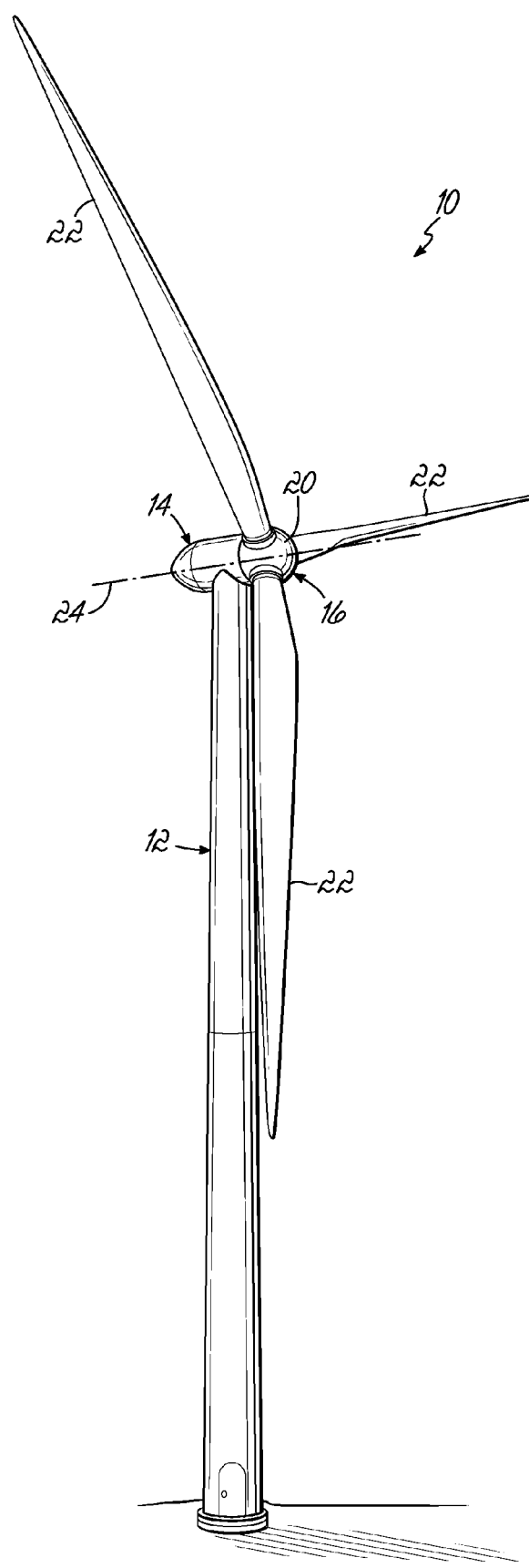
FIG. 1 is a diagrammatic view of a wind turbine.
Figure 2:
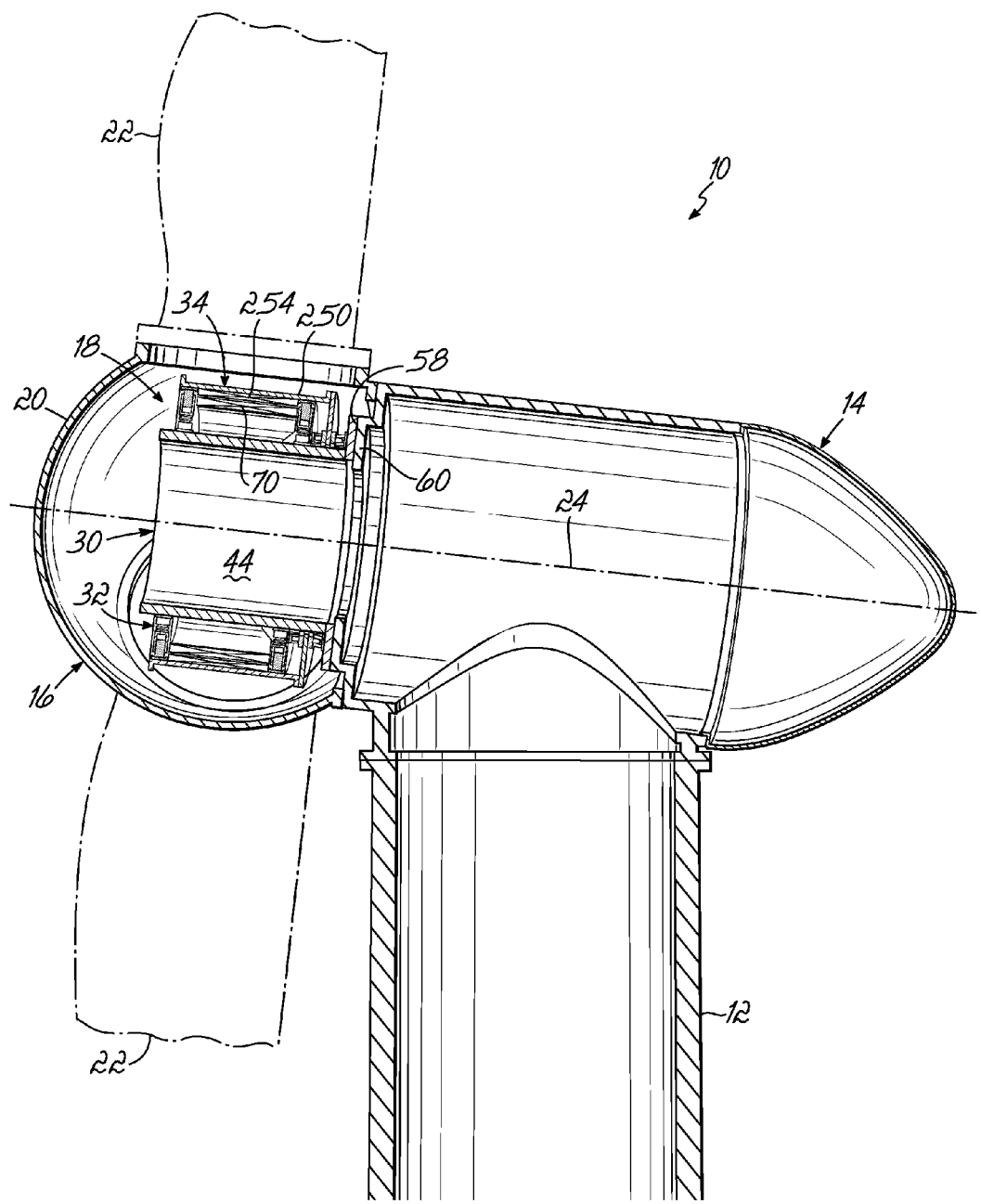
FIG. 2 is a perspective view of a portion of the wind turbine of FIG. 1 in which the nacelle is partially broken away to expose details of the wind turbine.

With reference to FIGS. 1 and 2 and in accordance with an embodiment of the invention, a wind turbine 10 includes a tower 12, a nacelle 14 disposed at the apex of the tower 12, and a rotor 16 operatively coupled to a generator 18. The rotor 16 of the wind turbine 10, which is represented as a horizontal-axis wind turbine, serves as the prime mover for the electromechanical system and includes a central hub 20 and a plurality of blades 22 that project outwardly from the central hub 20 at locations circumferentially distributed thereabout. In the representative embodiment, the rotor 16 includes three blades 22, but the number may vary. The blades 22 are configured to interact with the passing air flow to produce lift that causes the rotor 16 to spin about a longitudinal axis 24. The design and construction of the blades 22 are familiar to a person having ordinary skill in the art and will not be further described.

The nacelle 14 houses miscellaneous components required for converting wind energy into electrical energy and various components (not shown) needed to operate, control, and optimize the performance of the wind turbine 10, as is generally known in the art. The tower 12 supports the load presented by the nacelle 14, rotor 16, generator 18 and other components of the wind turbine 10 that are housed inside the nacelle 14. The tower 12 of the wind turbine 10 also operates to elevate the nacelle 14 and rotor 16 to a height above ground level or sea level, as may be the case, at which faster moving air currents of lower turbulence are typically found.

Wind exceeding a minimum level will activate the rotor 16 and cause rotation in a direction substantially perpendicular to the wind direction. The rotational movement is converted to electric power by the generator 18. The wind turbine 10 may be included among a collection of similar wind turbines belonging to a wind farm or wind park that serves as a power generating plant connected by transmission lines with a power grid, such as a three-phase alternating current (AC) power grid. The power grid generally consists of a network of power stations, transmission circuits, and substations coupled by a network of transmission lines that transmit the power to loads in the form of end users and other customers of electrical utilities. Under normal circumstances, the electrical power is supplied from the generator 18 to the power grid as known to a person having ordinary skill in the art.

FIGS. 3-10 illustrate an exemplary embodiment of a generator 18 in accordance with aspects of the invention that addresses many of the drawbacks of conventional generator designs. From a broad perspective, the conceptual approach of the present invention is not to address the disturbances acting on the generator using large, heavy and stiff structural generator components that, in essence, prevent deflections under load so as to maintain a consistent air gap between the stator and rotor assemblies of the generator. Instead, the design of the present application allows for some level of flexibility and deflection under load, therefore allowing for a less rigid or stiff design. However, these deflections are addressed in such a manner as to maintain a consistent air gap in the generator. In other words, the present approach does not try to prevent the deflections and perturbations, but tries to maintain a consistent air gap in the presence of the deflections and perturbations. This conceptually represents a significant departure from current generator design approaches. As will be discussed in detail below, this may be achieved by providing some level of controllable positioning of the stator assembly, i.e., flexible, but yet controllable stator positioning, and essentially "floating" the rotor assembly relative to the controllably movable stator assembly via a fluid film bearing (as opposed to roller element bearings of conventional designs).

It is contemplated that the internal disturbances caused by conventional roller element bearings, which are exacerbated in large load and large diameter applications (such as, for example, direct drive wind turbine applications), may be significantly alleviated by the use of plain bearings, which generally do not have a similar problem for large load, large diameter applications (i.e., upward scaling is generally not problematic). Thus, in one aspect of the invention, the generator design calls for a plain bearing arrangement between the stator and rotor assemblies. More particularly, in an exemplary embodiment, the generator design calls for a hydrostatic plain bearing.

In addition to the above-noted advantage, and generally speaking, plain bearings have an increased operating life relative to roller element bearings. The main reason for this is that, unlike roller element bearings, plain bearings do not have structural elements disposed between the two relative moving components for supporting the loads and facilitating low-friction movement. Instead, plain bearings generally have a fluid film disposed between the two relative moving components for supporting the loads and facilitating relative movement. Thus, the wear and fatigue issues associated with roller elements, as well as the costs associated with their replacement and maintenance, may be avoided. Consequently, plain bearings represent an attractive alternative to roller element bearings. Additionally, plain bearings are generally designed to operate with even lower friction, which may further increase efficiency.

There are two primary types of plain bearings: hydrostatic bearings and hydrodynamic bearings, each typically having an outer member defining an opening closely fitted around an inner member and a fluid film between the inner and outer members. In a hydrodynamic bearing, the rotation of one of the members self-pressurizes the fluid film in a wedge between confronting surfaces of the members so as to support the load and maintain separation of the inner and outer members. Unless the rotating member is rotating with sufficient speed, however, the fluid film may not be able to fully support the load and maintain the inner and outer members separate from each other. For this reason, hydrodynamic bearings may not be a particularly attractive option for maintaining separation of the stator and rotor assemblies of a direct drive wind turbine generator.

Hydrostatic bearings, on the other hand, include an external pump that pressurizes the fluid film around the inner member (independent of the particular dynamics of the rotating member) to support the load and maintain the inner member separate from the outer member, even when the rotating member is rotating slowly or not at all relative to the other member. To effectuate external pressurization of the fluid film, hydrostatic bearings typically include a number of pockets or cavities typically formed in a confronting surface, which pockets are supplied with lubricating fluid (e.g., oil, grease, etc.) from an external reservoir and pressurized by the external pump. Because the separation of the relative moving members does not depend on the dynamic state, these types of bearings may be more attractive for the plain bearing of the present generator design.

In addition to the use of a plain bearing to address various internal disturbances, aspects of the generator design address other disturbances, including other external and internal disturbances, through a position adjustment system associated with the stator assembly of the generator. Interestingly, in direct drive wind turbine applications, a significantly large portion of the disturbances may be broadly divided into two general classes. One class of disturbances generally includes high frequency, small amplitude perturbations or fluctuations. By way of example, and without limitation, the first class of disturbances imposed on the generator may come from oil film perturbations resulting from, for example, film pressure and oil flow variations; surface roughness or irregularities; tilt or wobble of the bearing pads (see below), or other sources.

The second class of external disturbances generally includes low frequency, large amplitude perturbations or fluctuations. Again by way of example, and without limitation, the second class of disturbances imposed on the generator may come from out of roundness/tolerance aspects of the generator components; changes in dimensions due to thermal discursions; deflections due to loads, and other sources. In this regard, depending on the location of the wind turbine, generators may see as much as a 40-50° C. variation in ambient temperature. These thermal variations may result in deflections in the system as much as 10 mm. Thus, thermal variations must generally be considered. In regard to deflections due to loads, there are generally two loads of concern. The first is the wind blade loads that result from the aerodynamic loading of the blades. The wind blade loads may be affected by, for example, the pitching operation of the blades, changing wind conditions, and other sources. The second is generator loads stemming from all the magnetic forces acting within the generator. The generator loads also change with changing magnetic conditions in the generator. In another aspect of the invention, and as discussed in more detail below, the position adjustment system includes a dual-mechanism device configured to accommodate first and second class disturbances. Through the design of the position adjustment system, it is believed that the generator may be operated in a manner that allows for reduced air gap widths, thereby increasing the efficiency of the generator. The benefits of the design also open the door to a greater variety of design options for generator designers and manufacturers.

FIGS. 3-10 schematically illustrate a generator 18 in accordance with one embodiment of the invention. The generator 18 includes a support 30 for supporting the generator 18 within the wind turbine 10, a stator assembly 32 coupled to the support 30, and a rotor assembly 34 concentrically disposed outwardly of the stator assembly 32 and configured to move relative to the stator assembly 32 to produce electricity in accordance with well-established principles. While the embodiment shown in the drawings has the rotor assembly as the outer member and the stator assembly as the inner member, it should be recognized that in an alternative embodiment, the rotor assembly may be configured as the inner member and the stator assembly configured as the outer member (not shown). Thus, the invention is not limited to the particular arrangement shown.

Figure 8:
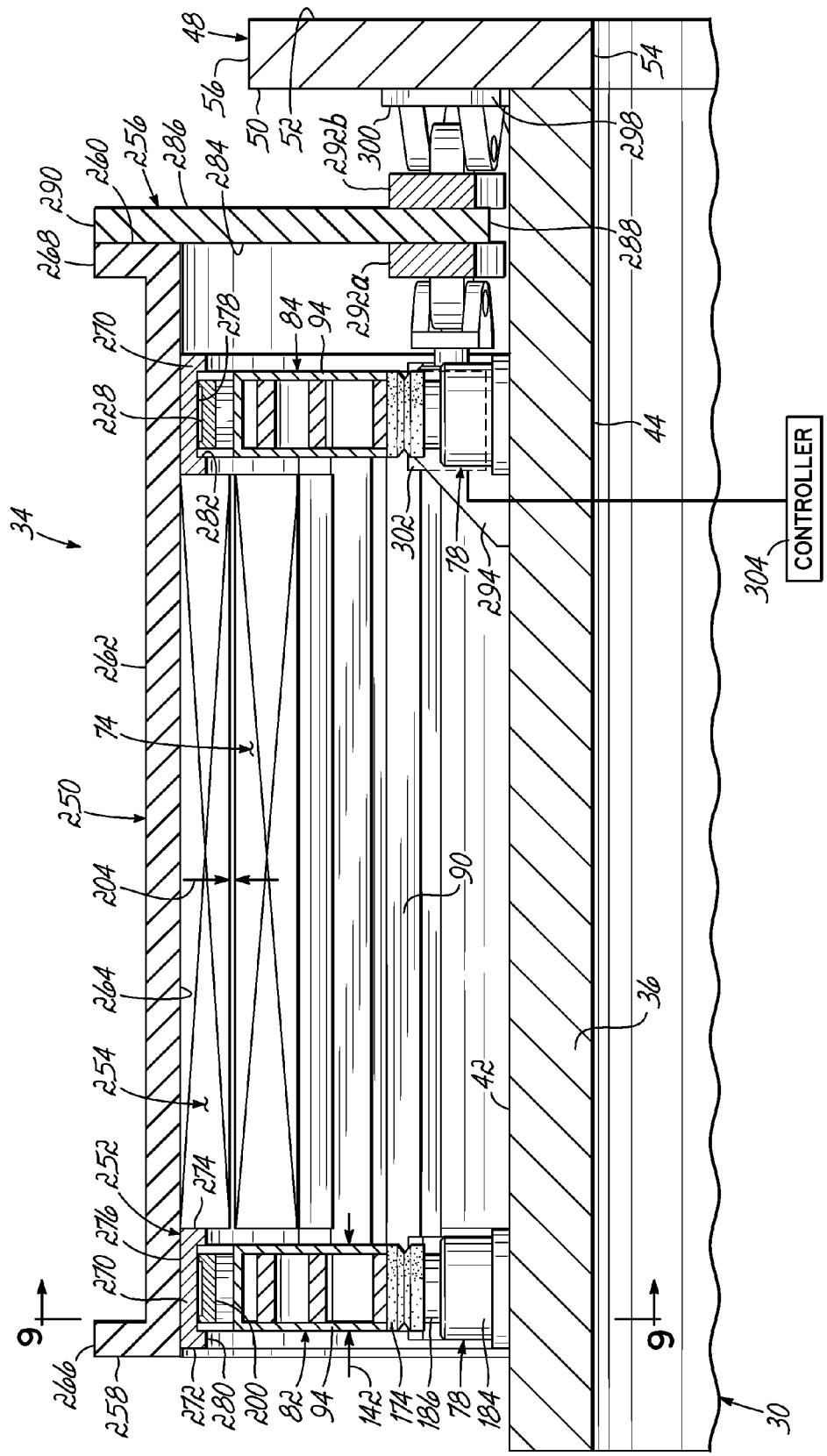
FIG. 8 is a partial cross-sectional view of the generator in accordance with an embodiment of the invention.

The support 30 includes a main support body 36, which in an exemplary embodiment may have a generally cylindrical, tubular configuration having a first end 38, a second end 40, an outer surface 42, an inner surface 44, and generally defining a rotational axis 46 of the generator 18. The support 30 further includes a backer plate 48 coupled to the second end 40 of the main support body 36 using, for example, a bolting process, a welding process, or other suitable process. The backer plate 48 includes a first surface 50 generally facing the main support body 36, a second surface 52 generally opposite to the first surface 50 and generally facing away from the main support body 36, an inner edge 54, and an outer edge 56 each extending between the first and second surfaces 50, 52 (FIG. 8). The inner edge 54 may be generally inward of, or at least generally aligned with, the inner surface 44 of the main support body 36, and the outer edge 56 may extend outwardly of the outer surface 42 of the main support body 36 such that the backer plate 48 operates as an annular flange about the main support body 36. In one embodiment, the main support body 36 and the backer plate 48 may be made from steel or other suitable metals or structural materials that can sufficiently support the loads being imposed thereon.

As generally illustrated in FIG. 2, the support 30 may be coupled to a corresponding support of the wind turbine 10. In this regard, and in an exemplary embodiment, the nacelle 14 may include a front side 58 having a generally annular support flange 60 to which the backer plate 48 of the support 30 is configured to couple. This may be achieved, for example, by use of bolts or other suitable fasteners (not shown) or processes. It should be recognized that the support 30 is fixedly secured to the nacelle 14 such the support 30 should be considered substantially stationary, and thus provide the foundation for sufficiently supporting the stator and rotor assemblies 32, 34 of the generator 18 in a manner described in more detail below.

It should be further recognized that, as shown in the figures and described above, the generator 18 may be generally positioned outside of the nacelle 14. In the instant case, for example, the generator 18 may be generally positioned within the central hub 20 of the rotor 16 (FIG. 2). Aspects of the invention, however, are not so limited, as the generator 18 may be coupled to a framework of the nacelle 14 in a manner that generally locates the generator 18 within the interior of the nacelle 14. Thus, aspects of the invention are not limited to the particular position of the generator 18 in the wind turbine 10.

Turning now to the stator assembly 32, in an exemplary embodiment, the stator assembly 32 may be movably supported by the support 30 in generator 18 such that the stator assembly 32, or at least portions thereof (as explained below), is capable of variable and controllable positioning relative to the support 30. More particularly, in one embodiment, the stator assembly 32 may include a segmented design including at least two, and preferably more than two, stator segments 70 that collectively form the stator assembly 32. In the embodiment shown, the stator assembly 32 includes eight such stator segments 70, but the invention is not so limited, as more or less stator segments may collectively comprise the stator assembly 32. It should be recognized that each stator segment 70 has essentially the same construction and operation. Thus, the description of one of the stator segments 70 should suffice as a sufficient description of the other stator segments 70 which form stator assembly 32.

Figure 6:
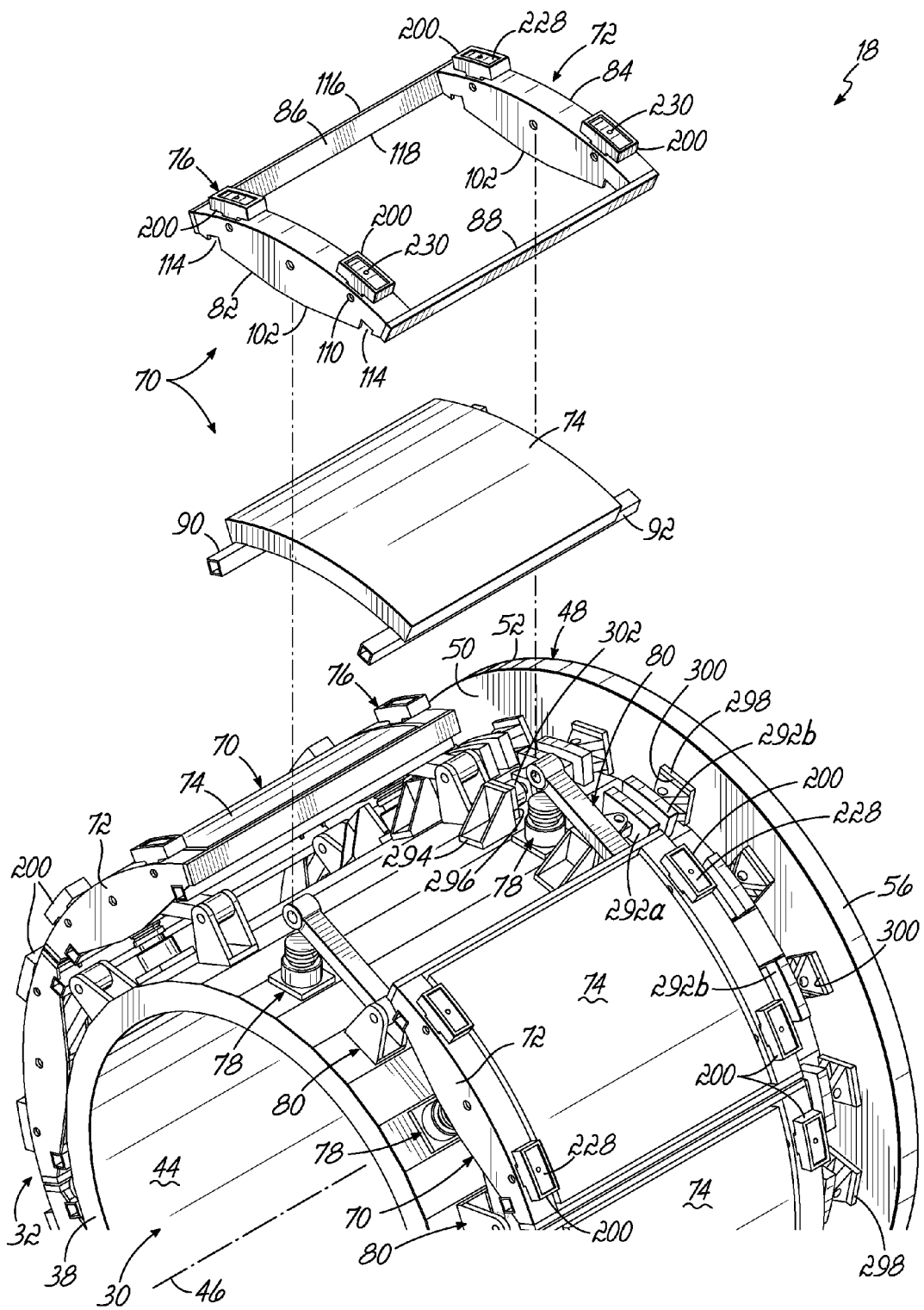
FIG. 6 is a partial disassembled view of the generator shown in FIG. 5.
Figure 7:
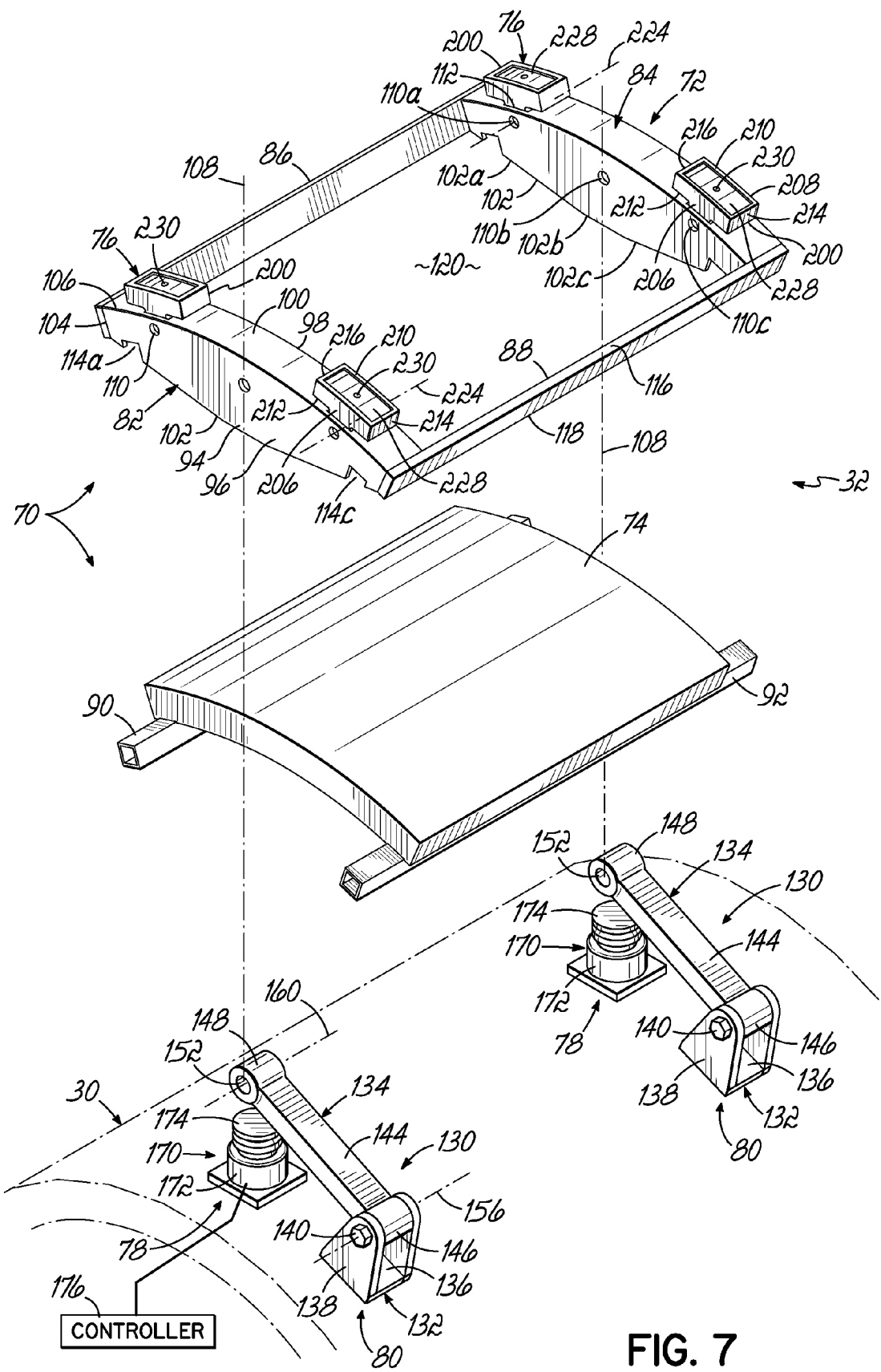
FIG. 7 is an enlarged perspective view of the generator shown in FIG. 6.

As best illustrated in FIGS. 6 and 7, an exemplary stator segment 70 includes a main segment frame 72, a stator segment envelope 74, a bearing portion 76, a position adjustment mechanism 78, and a pivot support mechanism 80. The main segment frame 72 provides a framework for supporting the stator segment envelope 74, which houses the coils (not shown) of the stator assembly 32 in which current is induced. As the coils, and in particular their construction and arrangement, within the stator segment envelope 74 are generally known to those of ordinary skill in the art, no further discussion is deemed necessary in order to understand the various aspects of the invention. The main segment frame 72 may have a generally rectangular construction including, in an exemplary embodiment, first and second spaced apart (e.g., in an axial direction of the generator 18) end rails 82, 84, and first and second spaced apart (e.g., in a circumferential direction of the generator 18) side rails 86, 88. The main segment frame 72 may further include a first and second spaced apart (e.g., also in the circumferential direction of the generator 18) support rails 90, 92 configured to help support the stator segment envelope 74 within main segment frame 72.

Each of the end rails 82, 84 has a similar construction and operation and a description of one end rail should suffice as a sufficient description of the other end rails (reference being made to end rail 82). End rail 82 includes an inverted U-shaped body 94 having first side wall 96, a second side wall 98 spaced apart from the first side wall 96, and an outer wall 100 extending between the first and second side walls 96, 98 (FIG. 7). There is no inner wall nor any end walls, and the end rail 82 remains generally open in these areas. The end rail 82 may be formed from steel, other suitable metals, or other materials capable of handling the loads being imposed thereon.

The first and second walls 96, 98 define an inner edge 102, side edges 104, and outer edge 106. The outer edge 106 is generally arcuate and in an exemplary embodiment, includes a substantially constant radius of curvature relative to the rotational axis 46. In one embodiment, the side edges 104 may be generally perpendicular to the outer edge 106 such that the side edges 104 generally lie along a radial line drawn from the rotational axis 46 to the ends of the rail 82. The outer and side edges 106, 104 have a relationship to rotational axis 46 such that when the plurality of stator segments 70 are assembled, the stator assembly 32, generally as a whole, has a generally circular cross-sectional configuration. In one embodiment, the inner edge 102 may be formed from three generally linear portions 102a, 102b, 102c. The central portion 102b, in an exemplary embodiment, may be substantially parallel to a tangent line to the outer edge 106 at a central axis 108 of the stator segment 70. The portions 102a and 102c are angled relative to central portion 102b in a symmetric manner relative to central axis 108.

First and second side walls 96, 98 include a plurality of generally axially-aligned through holes 110 configured to receive pins or the like for purposes that are described more fully below. One through hole 110b is along a central portion of the end rail 82 and two additional through holes 110a, 110c are positioned outboard thereof so as to be adjacent the outer edge 106 and respective side edges 104. The outer wall 100 also includes a pair of cutouts 112 (FIG. 9) configured to receive elements of the bearing portion 76, as discussed below. The cutouts 112 may be generally square or rectangular in shape and may be generally radially aligned with the through holes 110a, 110c in the side walls 96, 98. Additionally, the side walls 96, 98 may include notches 114a, 114c formed therein adjacent to respective side edges 104 and open to the inner edges 102a, 102c of the side walls 96, 98, respectively.

The first and second side rails 86, 88 may take the form of generally rectangular plates made of steel, other suitable metals, or other suitable materials, and may extend between the first and second end rails 82, 84 and couple thereto along the side edges 104 of first and second side walls 96, 98 (and possibly along an edge of outer wall 100). For example, the side rails 86, 88 may be coupled to the end rails 82, 84 via bolts or other suitable fasteners, or by other processes, such as welding. An outer side 116 of the side rails 86, 88 may be generally flush with the outer wall 100 of the end rails 82, 84, and an inner side 118 may be positioned at an inner end of the side edges 104 such that the side rails 86, 88 span substantially the full length of the side edges 104.

In an exemplary embodiment, the first and second support rails 90, 92 may take the form of a generally square or rectangular solid or hollow bar and similarly extend between the first and second end rails 82, 84. The support rails 90, 92 are slightly inboard of the side rails 86, 88 and are configured to be received in the notches 114 of the end rails 82, 84. The support rails 90, 92 may be coupled to the end rails 82, 84 at the notches 114 using fasteners or other processes, such as welding. Collectively, the end rails 82, 84, side rails 86, 88, and support rails 90, 92 define a cavity 120 configured to receive and support the stator segment envelope 74.

The main segment frame 72 and the stator segment envelope 74, which is carried thereby, is guided and/or supported relative to the support 30 via two mechanisms, the pivot support mechanism 80 and the position adjustment mechanism 78, each facilitating movement of the main segment frame 72 in relation to the support 30 in some manner. As best illustrated in FIGS. 6 and 7, the pivot support mechanism 80 includes a pair of pivot support units 130, one associated with respective end rails 82, 84 of the main segment frame 72. Each pivot support unit 130 includes a clevis 132 and a pivot arm 134. The clevis 132 includes a base 136 and two upstanding walls or studs 138, each having a through hole 140 which is axially aligned with each other. The base 136 is secured to the support 30, and more particularly, secured to the outer surface 42 of the main support body 36 through, for example, a bolting process, a welding process, or other suitable process. The devises 132 are positioned to the side of the stator segment 70, such as adjacent one of the side rails 86, 88, and further positioned axially so that the devises 132 are circumferentially aligned with a spacing or gap 142 (FIG. 8) between the first and second side walls 96, 98 of the end rails 82, 84.

Figure 9:
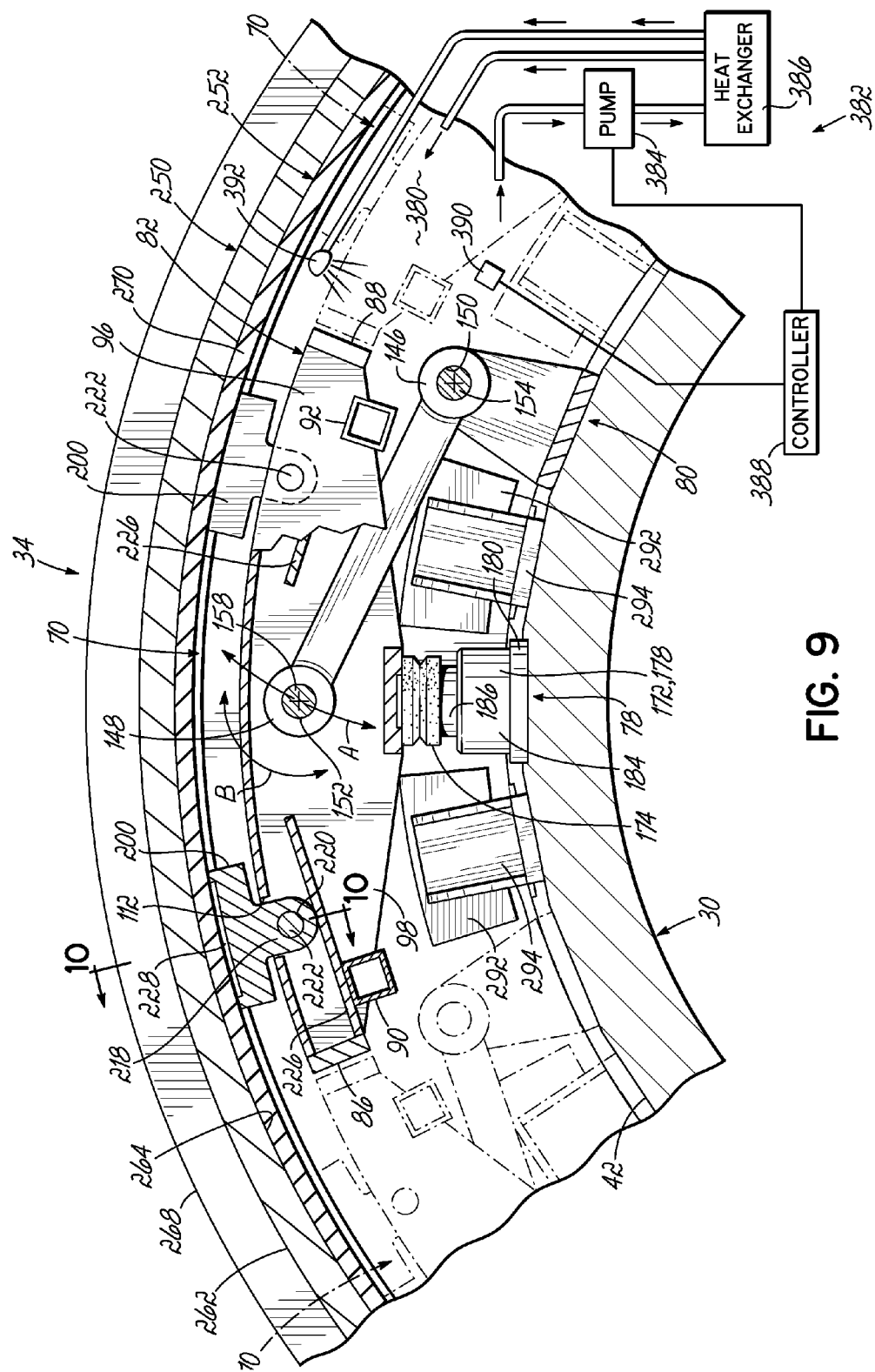
FIG. 9 is another partial cross-sectional view of the generator in accordance with an embodiment of the invention.

The pivot arm 134 of the pivot support units 130 includes a central elongate rod 144 having a first head 146 attached to a first end of the central elongate rod 144 and a second head 148 attached to a second end of the central elongate rod 144. Each head 146, 148 includes an axially-directed through hole 150, 152, respectively. The first head 146 may be positioned between the two studs 138 of the clevis 132 such that the through holes 140, 150 are aligned and pivotally secured thereto via a pivot pin 154 (FIG. 9). The pivot pin 154 defines a first pivot axis 156, which may be generally axially directed and generally parallel to rotational axis 46. The central elongate rod 144 extends into the interior of the end rails 82, 84 between the side walls 96, 98 via the opening along the inner edges 102 of the side walls 96, 98. The second head 148 may be positioned such that the through holes 110b, 152 are aligned and pivotally secured thereto via a pivot pin 158 (FIG. 9) that defines a second pivot axis 160, which is likewise generally axially directed and generally parallel to rotational axis 46.

The pivot support mechanism 80 in essence constrains or guides the movement of the stator segments 70 relative to the support 30. In this regard, the pivot pin 154 of the pivot support units 130 that defines first pivot axis 156 allows the main segment frame 72 (and stator segment envelope 74 carried thereby) to generally move in a direction illustrated by arrow A in FIG. 9. While the movement path of the main segment frame 72 about first pivot axis 156 is technically arcuate (having, for example, a radius of curvature established by the length of the pivot arm 134), the anticipated range of movement of the main segment frame 72 about first pivot axis 156 during use is expect to be relatively small compared to the radius of curvature such that the path of the main segment frame 72 may be considered substantially linear.

In an exemplary embodiment, that substantially linear path established by the first pivot axis 156, when viewed relative to the support 30, may extend in a substantially radial direction relative to the rotational axis 46. Thus, the pivot support units 130 of the pivot support mechanism 80 constrains the movement of the main segment frame 72 to substantially radial movements relative to the support 30 and the rotational axis 46 of the generator 18. By way of example, and without being limited thereby, it is anticipated that the stator segments 70 may be adjustably positioned substantially radially through a range of several millimeters. This range should be configured to accommodate the largest deflections expected on the generator 18 and may in an exemplary embodiment have a range of between 10-20 mm in use. As explained below, this generally radial movement of the stator segments 70 may be controlled by the position adjustment mechanism 78. In some applications, the stator segments 70 may move through a larger range such that its movement is not substantially radial, but arcuate as dictated by the pivot support mechanism 80.

The pivot pin 158 of the pivot support units 130 that defines the second pivot axis 160 allows the main segment frame 72 (and stator segment envelope 74 carried thereby) to generally rotate there about in a manner generally illustrated by arrows B in FIG. 9. For example, pivot pin 158 allows the stator segment 70 to rock back and forth about second pivot axis 160. It should be recognized that unlike the radial movement of the stator segment 70 discussed above, the movement of the stator segment 70 about second pivot axis 160 has no active control, but instead is generally dictated by the loading on the rotor assembly 34 (and imposed thereon by rotor 16), and the dynamic response of the movable stator assembly 32 due to that loading. Of course, the pivot support units 130 may include a limit mechanism (not shown) that limits the degree to which the main segment frame 72 can rotate about the second pivot axis 160. In any event, providing this pivotal connection gives a greater degree of freedom to the movements of the stator segments 70 under load. This, in turn, allows the generator 18 to accommodate a greater variety of loads in a manner that allows the air gap to be more consistently maintained.

As discussed above, due to the pivot support mechanism 80, the stator segments 70 are capable of moving in a substantially radial direction relative to the support 30 and the rotational axis 46 of the generator 18. This movement is achieved and controlled by the position adjustment mechanism 78. In an exemplary embodiment, and as best illustrated in FIG. 7, the position adjustment mechanism 78 includes a pair of position adjustment units 170, one associated with respective end rails 82, 84, operatively coupled to the main segment frame 72 for controlling the movement of the stator segment 70. Although two position adjustment units 170 are shown, it should be recognized that each stator segment 70 may have one or more than two position adjustment units 170, as dictated by the design or specific application. In one embodiment, each position adjustment unit 170 may include a first active control member 172 and a second passive member 174. The first active control member 172 may be configured to be actively controlled so as to selectively position or move the stator segment 70 to a desired location. By way of example, the first member 172 may be operatively coupled to a controller, shown schematically at 176, for controlling the position of the stator segment 70. The second member 174, however, and in an exemplary embodiment, may lack such an active control and be configured as a passive member for purposes described below.

The position adjustment units 170 are supported by support 30 and may extend to the main segment frame 72. In an exemplary embodiment, the first member 172 may include an actuator 178 having a first end 180 coupled to the support 30 and, more particularly, coupled to the outer surface 42 of the main support body 36 (FIG. 9). This may be achieved, for example, through a bolting process, a welding process, or other suitable process. The actuator 178 may be, for example, a hydraulic actuator, a pneumatic actuator, or other type of actuator, such as other linear actuators or other electrical/mechanical actuators. In one embodiment, the actuator 178 may be a hydraulic actuator having a cylinder 184 and a selectively movable rod 186 extending therefrom with a base of the cylinder being coupled to the support 30. The actuator 178 may be positioned generally radially inward of the stator segment 70 (e.g., beneath it), and further be positioned axially on the main support body 36 such that the actuator 178 is aligned with the gap 142 between the first and second side walls 96, 98 of the end rails 82, 84. The actuator 178 may be arranged so that the movement of the rod 186 is in a substantially radial direction relative to the support 30 and the rotational axis 46.

The second member 174 may include a first end coupled to an end of the rod 186 and may extend to a respective end rail 82, 84. In this regard, the end rails 82, 84 may include a connecting plate (not shown) configured to abut with or couple to a second end of the second member 174. In general, the second member 174 is configured as a generally passive compliant member having, for example, a certain amount of deflection capability (e.g., elastic deformations). By way of example, and without limitation, in an exemplary embodiment, the second member 174 may include a spring. Other compliant members may also be possible including, for example, various bladders and blocks made from elastomeric materials, such as natural rubbers, or synthetic rubbers including styrene-butadiene rubber, butyl rubber, polyurethane, silicone rubber, and/or bromobutyl rubber.

The second member 174 may also include a damping aspect so as to, for example, dissipate disturbances. This may be achieved through a separate component, such as a dash pot or other damper or absorber. Alternatively, the damping may be made an integral or inherent part of the compliant member itself. In any event, it should be recognized that in an exemplary embodiment, the first and second members 172, 174 may be arranged in series to achieve the desired behavior of the position adjustment mechanism 78. Other arrangements, however, may be possible. For example, in an alternative embodiment, the second member may be omitted.

Figure 10:
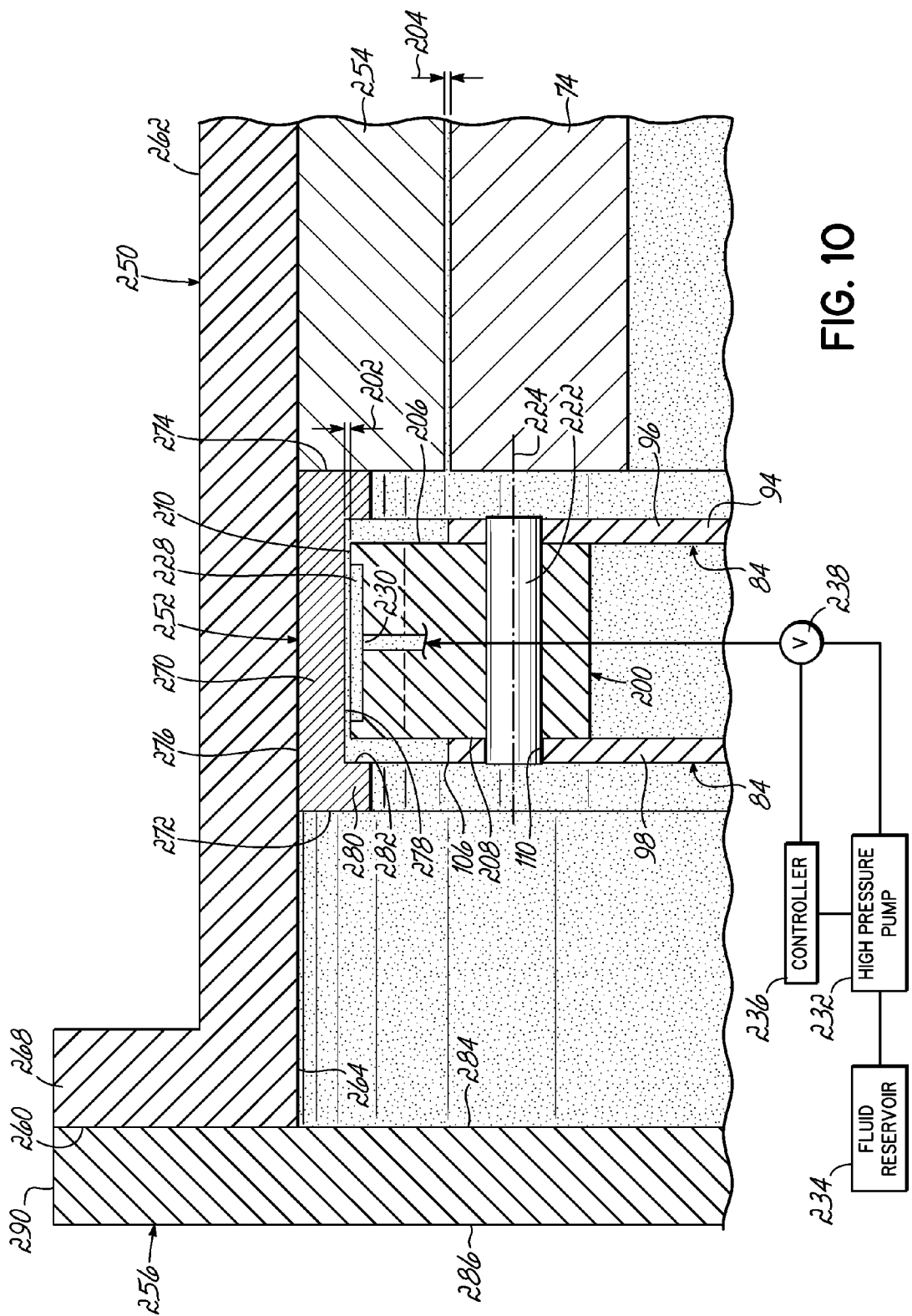
FIG. 10 is an enlarged partial cross-sectional view of the generator in accordance with an embodiment of the invention.

As discussed above, one aspect of the invention replaces the typical roller element bearing with a plain bearing, and more particularly a hydrostatic plain bearing. In an exemplary embodiment, the structural components for achieving the fluid film of the plain bearing may be carried by the stator assembly 32. More particularly, in one embodiment, the stator assembly 32 includes a plurality of pads, generally shown at 200, each capable of establishing and/or maintaining a fluid film 202 for supporting the rotor assembly 34 relative to the stator assembly 32 in a substantially non-contact manner, but allowing relative movement therebetween. As illustrated in FIG. 10, the fluid film 202 defines the air gap 204 for the generator 18. More particularly, the fluid film 202 that maintains separation of the stator and rotor assemblies 32, 34, also establishes the air gap 204 between the coils in the stator segment envelope 74 and the magnets in the rotor assembly 34 (described below).

As illustrated in the figures, in one embodiment, each stator segment 70 includes at least one, and preferably a plurality of pads 200. More particularly, in an exemplary embodiment, each end rail 82, 84 of the main segment frame 72 may include two pads 200 symmetrically disposed relative to central axis 108 (e.g., adjacent side edges 104) and axially parallel with each other. In an exemplary embodiment, the pads 200 may be adjacent to or associated with the outer wall 100 of each of the end rails 82, 84, as shown. It should be recognized, however, that other pad configurations are also possible and remain within the scope of the present invention. For example, each end rail 82, 84 may include fewer or additional pads 200. Preferably, the arrangement of the pads 200 on end rails 82, 84 are substantially identical to provide axial symmetry to stator segment 70. Notably, the pad arrangement on each of the stator segments 70 that form stator assembly 32 does not have to be identical, but may differ in their respective pad arrangements. For those embodiments having different pad arrangements on stator segments 70, however, the pad arrangement of the stator assembly 32 (taken as a whole) preferably includes rotational symmetry such that the stator assembly 32 is generally well balanced.

While the embodiment shown in the figures shows the pads 200 associated with the stator assembly 32, it should be recognized that in an alternative embodiment, the pads 200 may be associated with the rotor assembly 34, such as being positioned on an inner surface of the rotor assembly 34 which faces or confronts the stator assembly 32 (not shown). Additionally, while the figures illustrate separate pads 200 for establishing and/or maintaining fluid film 202, in another alternative embodiment, the pads 200 may be omitted and the fluid film 202 established directly between surfaces of the stator and rotor assemblies 32, 34. For example, the fluid pockets or cavities (see below) may be formed directly in the outer wall 100 of the end rails 82, 84 (not shown). Accordingly, aspects of the invention are not limited to the exemplary embodiments shown herein.

In an exemplary embodiment, the construction of each of the pads 200 is substantially the same and a description of one will suffice as a sufficient description of each of the pads 200 in the bearing mechanism 76. In this regard, a pad 200 has a shape of a generally rectangular block or prism and includes a first side wall 206, a second side wall 208 spaced apart from the first side wall 206, an outer bearing wall 210 extending between the first and second side walls 206, 208, an inner engaging wall 212 opposite the outer wall 210 and also extending between the first and second side walls 206, 208, and a pair of spaced apart end walls 214, 216. In an exemplary embodiment, the inner engaging wall 212 and the outer bearing wall 210 may be generally arcuate so as to substantially match the curvature of the outer edge 106 of the end rails 82, 84 and the curvature of the rotor assembly 34, respectively. Moreover, the axial dimension of the pads 200 may be configured to align with, or be slightly less than, the gap 142 between side walls 96, 98 of the rails 82, 84 so as not to extend therebeyond.

In one embodiment, the pads 200 may be pivotally coupled to the end rails 82, 84. In this regard, and as illustrated in FIG. 9, the pads 200 may include an ear 218 extending from the inner engaging surface 212 of the pad 200 having an axially-extending through hole 220 near an inner end thereof. The pivot coupling may be achieved by directing the ear 218 through respective cutouts 112 in the outer wall 100, aligning the through holes 220 with through holes 110a, c, and securing the pads 200 with a pivot pin 222, which defines a pivot axis 224.

The cutouts 112 have a circumferential dimension greater than that of the ears 218 so as to permit some rotation of the pads 200 about pivot axes 224 within cutouts 112. For example, the pads 200 may be configured to pivot through an angle of about 20 degrees (e.g., 10 degrees to each side of its centered position). The end rails 82, 84 may include a pad support plate 226 to alleviate some of the load carried by the pivot pin 222 and facilitate pivotal movement of the pads 200. The pivotal movement of the pads 200 have no active control, but instead is generally dictated by the loading on the rotor assembly 34 (and imposed thereon by rotor 16), and the dynamic response of the movable stator assembly 32 due to that loading. While pivotal movement of the pads 200 relative to the end rails 82, 84 may be preferred, in an alternative embodiment, this pivotal movement may be eliminated. In such an embodiment, the pads 200 (without ears 218) may be coupled to the outer wall 100 of the end rails 82, 84 through, for example, a bolting or welding process.

Each of the pads 200 includes a fluid pocket or cavity 228 formed in the outer bearing surface 210 so as to confront or be open to the rotor assembly 34 when assembled. The cavity 228 may have various configurations including, for example and without limitation, a rectangular configuration, a curved or arcuate configuration, or a wedge configuration, each of which is described in more detail in co-owned U.S. application Ser. Nos. 12/883,695 and 12/883,702, each of which is incorporated by reference herein in its entirety. Each cavity 228 may have a depth, such as a maximum depth or an average depth, of about 2 mm. Of course, the depth of cavity 228 may vary depending on the particular application, but is generally expected to be about 2 mm or greater.

Each pad 200 includes at least one port 230 open to the cavity 228 in outer bearing surface 210. Port 230 operates as a high pressure port for introducing fluid to the bearing mechanism 76 and pressurizing the fluid film 202 (exaggerated in the figures for illustrative purposes). In this regard, and as illustrated in FIG. 10, the at least one fluid port 230 may be operatively coupled to a pressure generating device, such as a pump, schematically shown at 232, configured to pressurize the fluid film 202. The pump 232 should be rated so as to sufficiently pressurize the fluid film 202 to a level that supports the anticipated loads on the bearing mechanism 76.

The pump 232 may be operatively coupled to a fluid supply or reservoir 234 for providing a supply of the fluid that forms the fluid film 202 between the outer bearing surface 210 of the pads 200 and an inner wall of the rotor assembly 34 during operation. The pump 232 may be operatively coupled to a controller, schematically shown at 236, for controlling the operation of the pump 232 and therefore pressurization of fluid film 202. The controller 236 may be an individual controller dedicated to controlling the pump 232. Alternatively, the controller 236 may be part of a larger control system for controlling the overall operation of the wind turbine 10.

A valve, shown schematically at 238, may be disposed in the line coupling the high pressure port 230 and the pump 232 so as to selectively isolate the fluid film 202 of the bearing mechanism 76 from the pump 232. The valve 238 may be operatively coupled to the controller 236 for selectively opening and closing the valve 238. It should be recognized that each pad 200 may be operatively coupled to its own dedicated pump 232, reservoir 234, and valve 238. Alternatively, all the pads 200 of a stator segment 70 may be operatively coupled to a common pump 232, reservoir 234, and valve 238. In another alternative embodiment, all the pads 200 of the stator assembly 32 may collectively be operatively coupled to a common pump 232, reservoir 234, and valve 238.

Turning now to the rotor assembly 34 of generator 18, in an exemplary embodiment, the rotor assembly 34 may be coupled to the central hub 20 of the rotor 16 of the wind turbine 10. Accordingly, the rotor assembly 34 is configured to rotate with the rotation of the rotor 16, which as noted above, may generally be in a range of about 5-25 rpm (i.e., relatively low rotational speed). The rotor assembly 34 includes an outer rotor shell 250, a rotor bearing journal 252, a rotor magnet envelope 254, and a backer plate 256. The outer rotor shell 250, in an exemplary embodiment, may have a generally cylindrical, tubular configuration having a first end 258, a second end 260, an outer surface 262, and inner surface 264. The first and second ends 258, 260 may include a radially-outwardly directed annular flange 266, 268, respectively.

Moreover, the outer rotor shell 250 may be sized so that the stator assembly 32 may be concentrically disposed in the interior thereof. By way of example and without limitation, the outer rotor shell 250 may have a diameter of several meters (e.g., 5-10 m), but can be made larger or smaller depending on the specific application. As is illustrated in FIG. 1, the outer rotor shell 250 may be coupled to the central hub 20 of the rotor 16. For example, the flanges 266, 268 may be sized so as to extend to and couple with an inner surface of the central hub 20. It should be recognized that there are other ways to couple the outer rotor shell 250 to the central hub 20 in a manner that allows the outer rotor shell 250 to rotate with rotation of the central hub 20. Thus, embodiments of the invention should not be limited to the particular configuration shown in the drawings. The outer rotor shell 250 may be made of steel, other suitable metals, or other suitable structural materials that can sufficiently support the load being imposed thereon.

The rotor bearing journal 252 may be configured to provide a suitable component for interacting with the bearing mechanism 76 of the stator assembly 32. More particularly, the rotor bearing journal 252 may be configured to provide a suitable bearing surface for interacting with the fluid film 202 generated and maintained by the plurality of pads 200 on the stator assembly 32. In this regard, the rotor bearing journal 252 may include a pair of bearing rings 270 which are positioned axially so as to generally align with the pads 200 on the rails 82, 84 of the stator assembly 32.

In an exemplary embodiment, and as illustrated in FIG. 10, each bearing ring 270 includes a first end 272, a second end 274, an outer surface 276, and an inner surface 278. The outer surface 276 of the bearing rings 270 may be coupled to the inner surface 264 of the outer rotor shell 250 through welding, bolting, or using other suitable processes or fasteners. The first and second ends 272, 274 of the bearing rings 270 may include a radially-inwardly extending lip 280 that together with the inner surface 278, defines a groove 282 configured to receive the pads 200 when the generator 18 is assembled. The axial width of the groove 282 is slightly larger than the axial width of the pads 200 so that the pads may be relatively snugly fit within the groove 282. The bearing rings 270 may also be made of steel or other suitable metals. Alternatively, the bearing rings 270 may be made of or include a coating of a material having low friction characteristics, including, for example, various plastics or other materials. Additionally or alternatively, the inner surface 278 of bearing rings 270 may be processed (machined, etched, etc.) so as to form a very smooth and regular confronting surface for pads 200. Such processing of the inner surface 278 may further minimize disturbances of the fluid film 202.

Similar to the stator segment envelope 74, the rotor magnet envelope 254 is configured to house magnets or magnetic elements (not shown) for generating the magnetic field which induces a current in the coils carried by the stator assembly 32. As the magnets, and in particular their construction and arrangement, within the rotor magnet envelope 254 are generally known to those of ordinary skill in the art, no further discussion is deemed necessary in order to understand the various aspects of the invention. In one embodiment, it is contemplated that permanent magnets may be carried by the rotor magnet envelope 254. In another embodiment, however, it is contemplated that electromagnets may be carried by the rotor magnet envelope 254. In either embodiment, it is submitted that one of ordinary skill in the art will understand how to outfit the rotor magnet envelope 254 with either permanent or electromagnets. In any event, the rotor magnet envelope 254 may be positioned on the inner surface 264 of the outer rotor shell 250 and generally disposed between the bearing rings 270. In this way, for example, the rotor magnet envelope 254 will be radially outward of and generally aligned with the stator segment envelopes 74 being carried by the plurality of stator segments 70. Of course, the stator segment envelopes 74 and the rotor magnet envelope 254 are separated by air gap 204 established by fluid film 202.

In addition to the above, the rotor assembly 34 may include a backer plate 256 coupled to the second end 260 of the outer rotor shell 250 using, for example, a bolting process, a welding process, or other suitable process or fastener. The backer plate 256 includes a first surface 284 generally facing the outer rotor shell 250, a second surface 286 generally opposite to the first surface 284 and generally facing away from the outer rotor shell 250, an inner edge 288 and an outer edge 290 extending between the first and second surfaces 284, 286. The outer edge 290 may be generally outward of, or at least generally aligned with, the outer edge of flange 268 of the outer rotor shell 250, and the inner edge 288 may extend inwardly of the inner surface 264 of the outer rotor shell 250 such that the backer plate 256 operates as an annular flange about the outer rotor shell 250. In one embodiment, the backer plate 256 may be made from steel or other suitable metals or structural materials that can sufficiently support the loads being imposed thereon.

In one embodiment, and as illustrated in FIG. 8, the annular flange of the backer plate 256 may be used as a thrust plate for accommodating axial loading on the generator 18. In this regard, while addressing the radial loading aspects of the generator 18 are important for maintaining a consistent air gap 204, the generator 18 may also be subjected to axial loading that must also be accommodated in the generator design. In an exemplary embodiment, this may be achieved using thrust pads 292 that interact with the backer plate 256 to accommodate the axial loading. Thrust pads 292 are generally known in the art and thus will not be described in further detail.

When the generator 18 is assembled, the inner edge 288 of backer plate 256 is radially outward of the outer surface 42 of the main support body 36 to allow the main support body 36 to extend through an opening defined by the inner edge 288 and thereby couple the support 30 to the wind turbine 10. However, the inner edge 288 of the backer plate 256 may be in close proximity to the support 30 such that thrust pads 292 coupled thereto may engage the backer plate 256. In this regard, in one embodiment, the thrust pads 292 may be arranged in pairs on opposite sides of the backer plate 256. For example, a first thrust pad 292a may be configured to engage with the first surface 284 of the backer plate 256 and a second thrust pad 292b diametrically opposed to the first thrust pad 292a may be configured to engage with the second surface 286 of the backer plate 256. The invention, however, is not so limited as other arrangements of the thrust pads 292 are possible. For example, the second thrust pads 292b may be circumferentially offset from the first thrust pads 292a. Additionally, the number of first and second thrust pads 292a, 292b may differ.

The first thrust pads 292a may be supported on support 30 using a support block 294. For example, the support block 294 may be fixedly coupled to the outer surface 42 of the main support body 36 and include a block surface 296 (FIG. 6) that generally faces or confronts the first surface 284 of the backer plate 256. Thrust pads 292a may be pivotally coupled to the block surface 296, such as with a clevis joint or the like. The second thrust pads 292b may be supported on support 30 using a base plate 298, which in an exemplary embodiment may be fixedly coupled to the first surface 50 of the support backer plate 48, and have a base surface 300 facing or confronting the second surface 286 of the backer plate 256. Thrust pads 292b may also be pivotally coupled to the base surface 300, such as with a clevis joint of the like.

Additionally, at least one of the thrust pads 292 (thrust pad 292a of each pair shown) may be selectively movable in, for example, a generally axial direction so as to vary the pressure being applied to the backer plate 256. In this regard, an actuator 302 may be operatively coupled to the thrust pad 292a for moving its position. The actuator 302 may be, for example, a hydraulic actuator, a pneumatic actuator, or other type of actuator, such as other linear actuators or other electrical/mechanical actuators. The actuator 302 may be coupled to a controller 304 for controlling the movement of the thrust pad 292a. The controller 304 may be a dedicated controller or alternatively, may be a common controller. By way of example, and without limitation, controller 304 may be incorporated into the other controllers described above. In any event, it should be realized that each thrust pad 292a may be controlled independently from the other thrust pads to give localized control for accommodating axial loading, as it may, for example, vary along the circumference of the generator 18.

Figure 3:
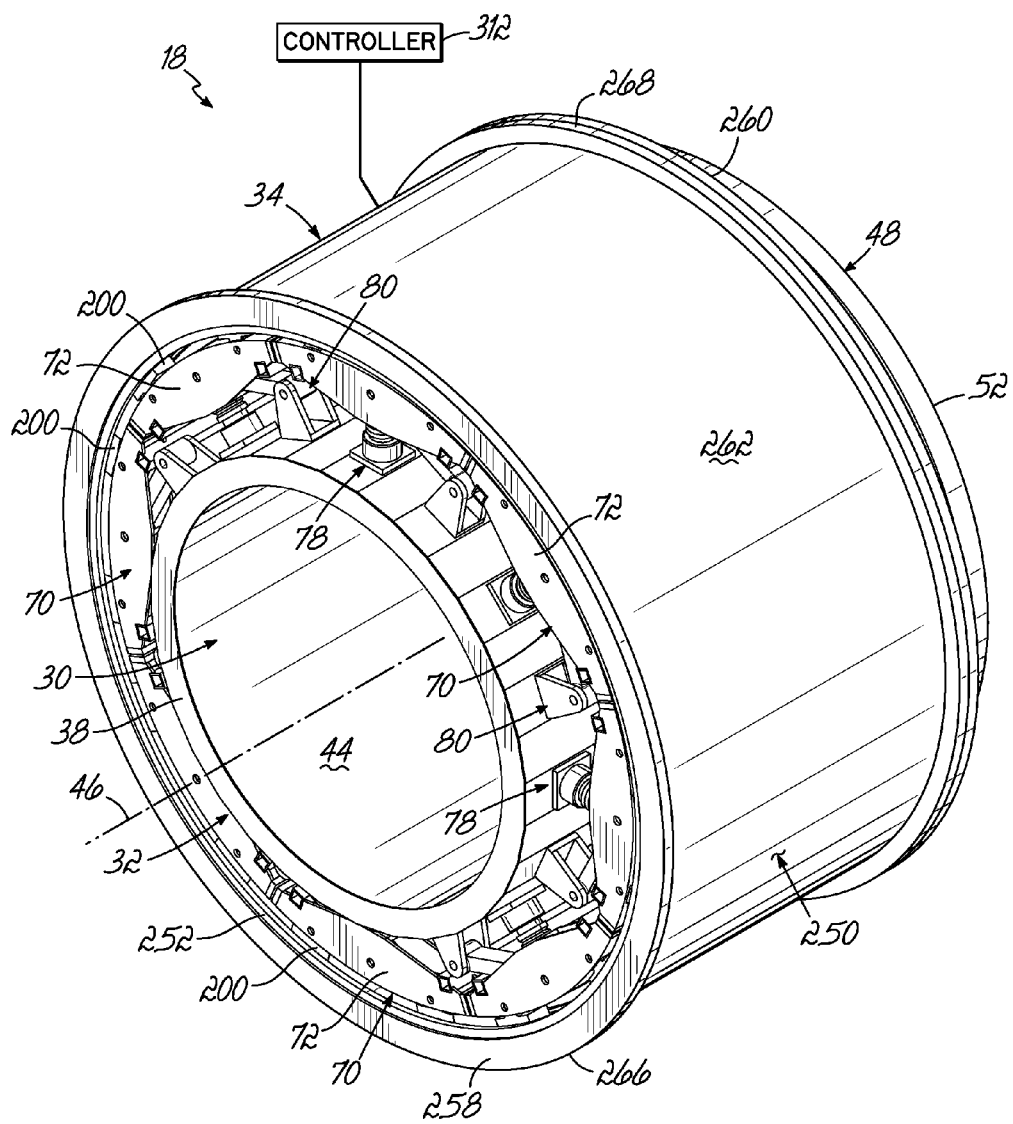
FIG. 3 is a perspective view of a wind turbine generator in accordance with an embodiment of the invention.
Figure 4:
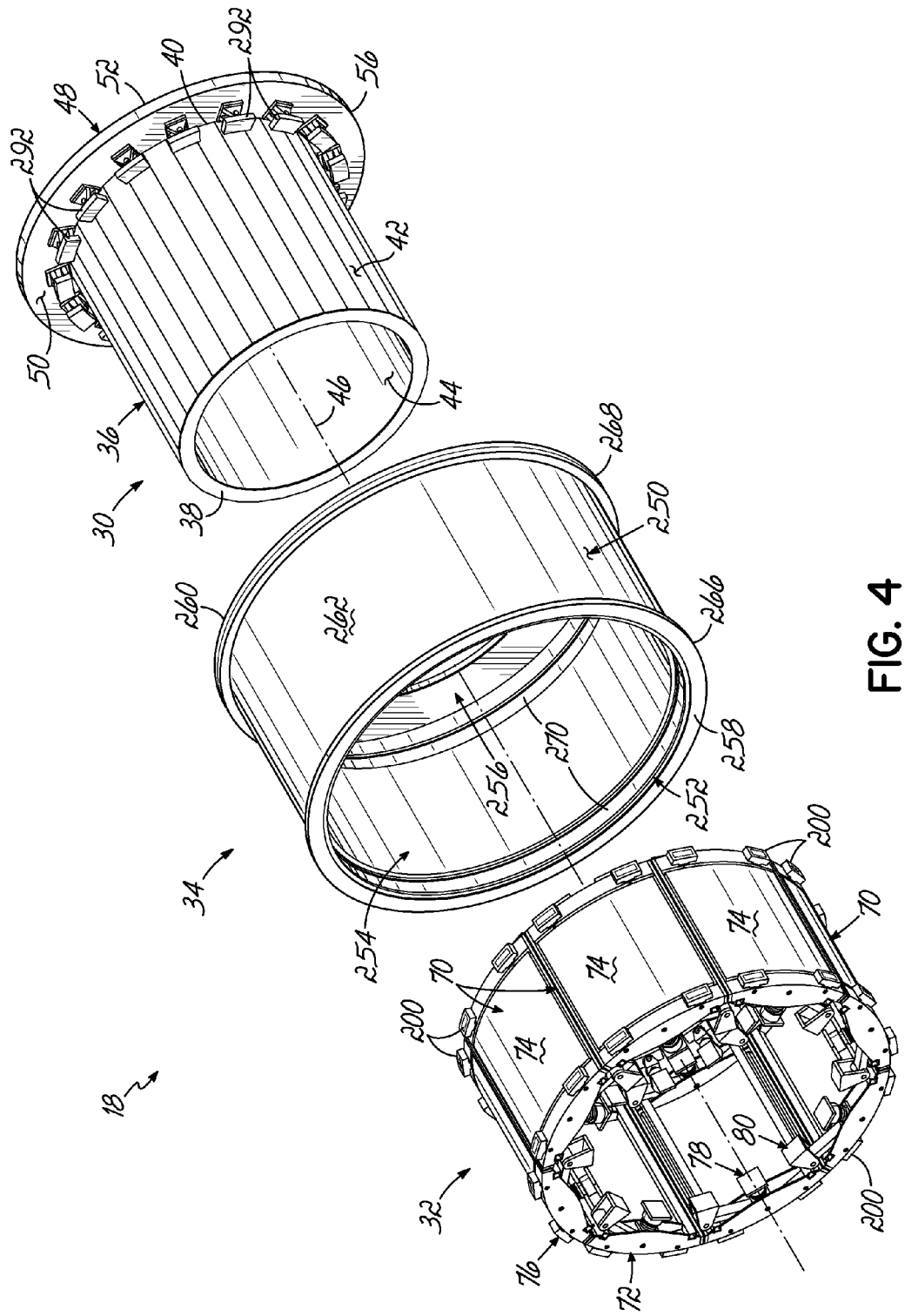
FIG. 4 is a perspective disassembled view of the wind turbine generator shown in FIG. 3.
Figure 5:
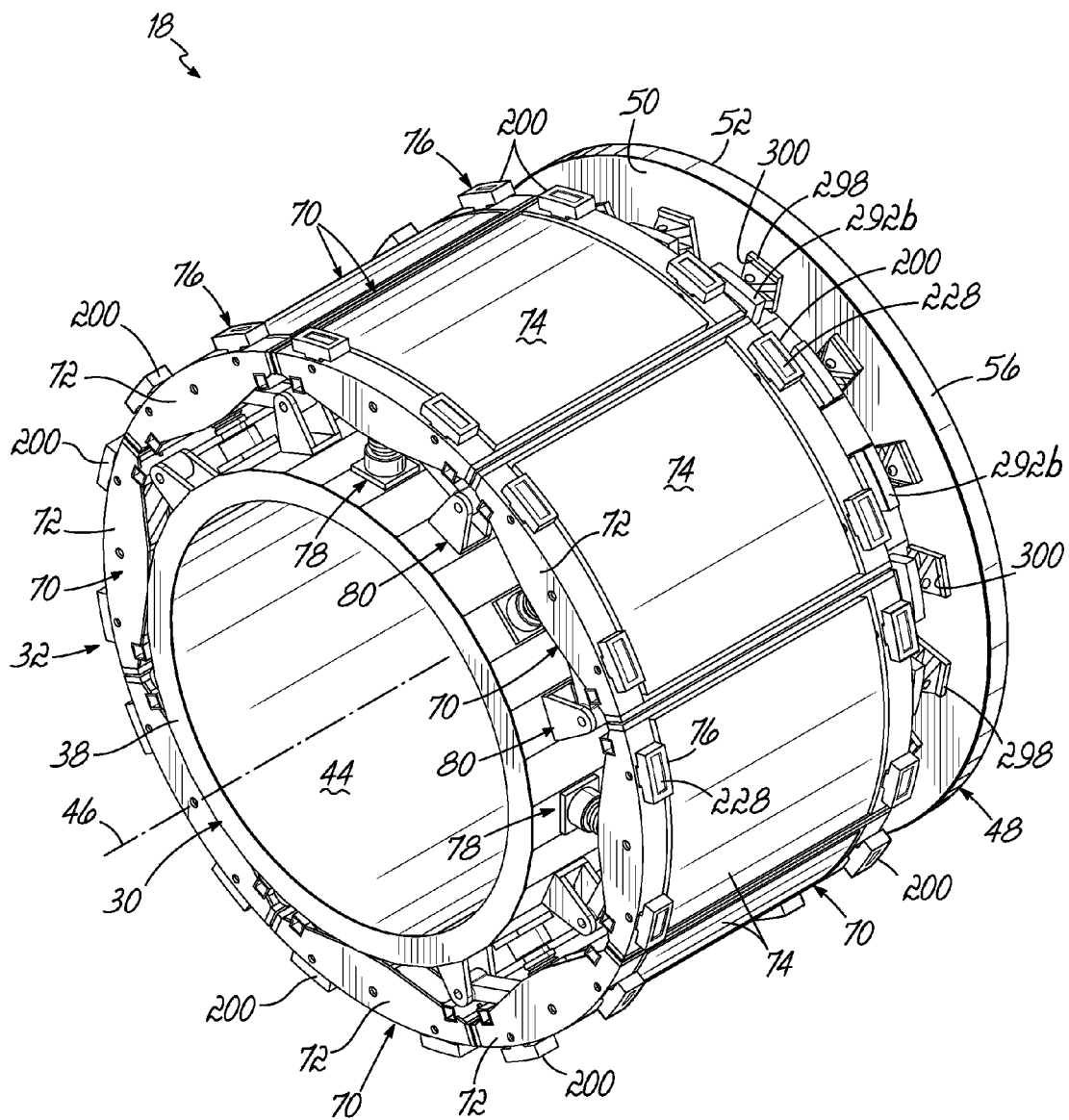
FIG. 5 is a perspective view of the generator shown in FIG. 3 with the rotor assembly removed for illustration purposes.

The assembled generator 18 in accordance with an exemplary embodiment of the invention is shown in FIG. 3. The generator 18 has a concentric configuration with the support 30 as the inner most member, the stator assembly 32 as an intermediate member, and the rotor assembly 34 as the outer most member. The support 30 may be secured to the nacelle 14 such that it does not rotate, and therefore provides the framework on which the remainder of the generator 18 may be built. The stator assembly 32 is then coupled to the support 30 in the manner described above. While the stator assembly 32 does not rotate generally about the rotational axis 46, the plurality of stator segments 70 that collectively comprise the stator assembly 32 are capable of some level of movement, as dictated by the pivot support mechanism 80 and the position adjustment mechanism 78 and described above. In this regard, the pivot support mechanism 80 essentially guides the movement of the plurality of stator segments 70, for example, restricting the movement along a substantially radial direction relative to rotational axis 46, and the position adjustment mechanism 78 provides the motive force for moving the stator segments 70 into desired positions in, for example, substantially radial directions. The plurality of stator segments 70 may be individually controlled by control system 176.

The rotor assembly 34 is generally disposed about the stator assembly 32 such that the pads 200 are generally aligned with, and may be at least partially disposed in, the grooves 282 in the bearing rings 270. More particularly, the outer bearing wall 210 of the pads 200 on the stator segments 70 confront the inner surface 278 of the bearing rings 270. In the exemplary embodiment, the generator 18 is configured as a direct drive system wherein the rotor 16 rotates the rotor assembly 34 about the rotational axis 46 and relative to the stator assembly 32.

In use, the pump 232 may be activated, such as by controller 236, so as to establish a pressurized fluid film 202 between the outer bearing surface 210 of the pads 200 and the inner surface 278 of the bearing rings 270. As explained above, due to this external pressurization, the fluid film 202 is capable of supporting the load on the stator assembly 32 independent of the hydrodynamic forces developed in the fluid film 202. Consequently, surface-to-surface contact between the stator segment envelope 74 and the rotor magnet envelope 254 may be substantially avoided by fluid film 202. In this embodiment, the fluid film 202 provides the "element" which maintains separation of the relatively moving aspects of the bearing (e.g., like the function of a roller element), and the fluid film 202 also establishes the air gap 204 between the stator and rotor assemblies 32, 34.

As noted above, the disturbances on the generator 18 may generally include a first class of loads characterized by relatively high frequency, small amplitude perturbations, and a second class of loads characterized by relatively low frequency, large amplitude perturbations. The first class of loads is not predictive in nature, but is generally random and may generally be characterized as having a frequency greater than about 1 Hz and amplitude of less than about 1 mm. These first class loads are accommodated in a passive manner by the fluid film characteristics and the second member 174 of the position adjustment mechanism 78. In other words, the position adjustment mechanism 78 does not attempt to actively manage the first class loads, but relies on the passive nature of the fluid film 202 and second member 174 to maintain a consistent air gap 204 in the presence of such loads.

The second class of loads, on the other hand, occur on a longer time scale and may generally be characterized as having a frequency less than about 1 Hz and an amplitude greater than about 1 mm. The second class loads are generally outside the capabilities of the second member 174 and may be accommodated in an active manner through control of the first member 172 of the position adjustment mechanism 78. Through active control of the first member 172, the air gap 204 may be consistently maintained even in the presence of the second class loads. Thus, the combination of active and passive mechanisms accommodates the first and second class loads such that the air gap 204 may be maintained in a consistent manner. The divide of 1 Hz and 1 mm between the first and second class of loads is exemplary and may vary depending on the particular application and circumstances.

Figure 11:
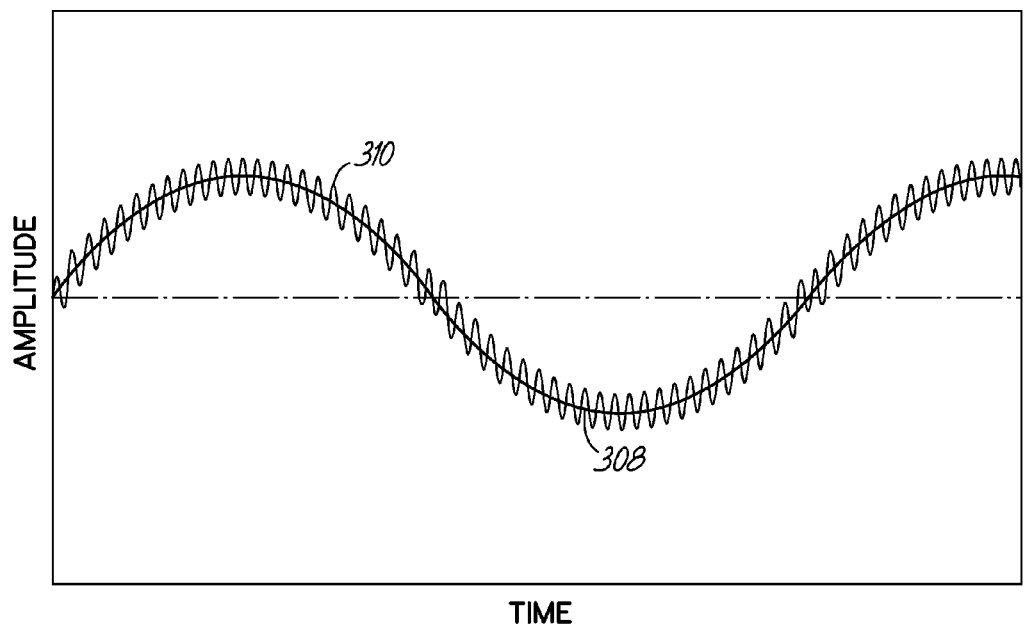
FIG. 11 is a schematic diagram of the loading on a generator.

FIG. 11 is a schematic diagram of the loading of the rotor 16 and how the loads may be accommodated by the design of the generator 18. The loads acting on the generator 18 may, in many exemplary cases, be characterized by a set point curve 308 and a modifying or noise curve 310 superimposed thereon. The set point curve 308 while varying, is characterized by having a relatively low frequency, but relatively large amplitude. The set point curve 308 may generally correspond to the second class loads. In contrast, the noise curve 310 may be characterized by having a relatively high frequency and low amplitude. The noise curve 310 may generally correspond to the first class disturbances.

The dual nature of the position adjustment mechanism 78 is configured to address the loading on generator 18. In this regard, the first member 172 may be configured to accommodate the loading illustrated by the set point curve 308. For example, the actuators 178 are capable of operating in a frequency and amplitude range commensurate with the frequency and amplitude of the set point curve 308. Such a configuration works for wind turbine applications because many of the sources of disturbances that affect the set point curve 308 are lower frequency effects. Similarly, the second member 174 may be configured to accommodate the loads illustrated by the noise curve 310. For example, the compliant member, such as a spring (or spring/damper combination) is capable of operating in a higher frequency, smaller amplitude range commensurate with that of the noise curve 310. Because the generator 18 is capable of accommodating these loads, operating the generator 18 with a smaller, more consistent air gap 204 may be achieved.

Because a relatively consistent air gap 204 may be maintained, even in the presence of the disturbances acting on the generator 18, the width of the air gap 204 may be reduced to levels that are simply not attainable in current direct drive generator designs. By way of example, and not limitation, it is believed that due to the ability to maintain the consistency of the fluid film 202, and thus the air gap 204, air gap widths on the order of about 1.0 mm are attainable (e.g., about 1-3 mm). More preferably, it is believed that air gap widths on the order of 0.1 mm may also be possible with the inventive design. This results in a number of benefits for direct drive wind turbines as discussed below.

Figure 12:
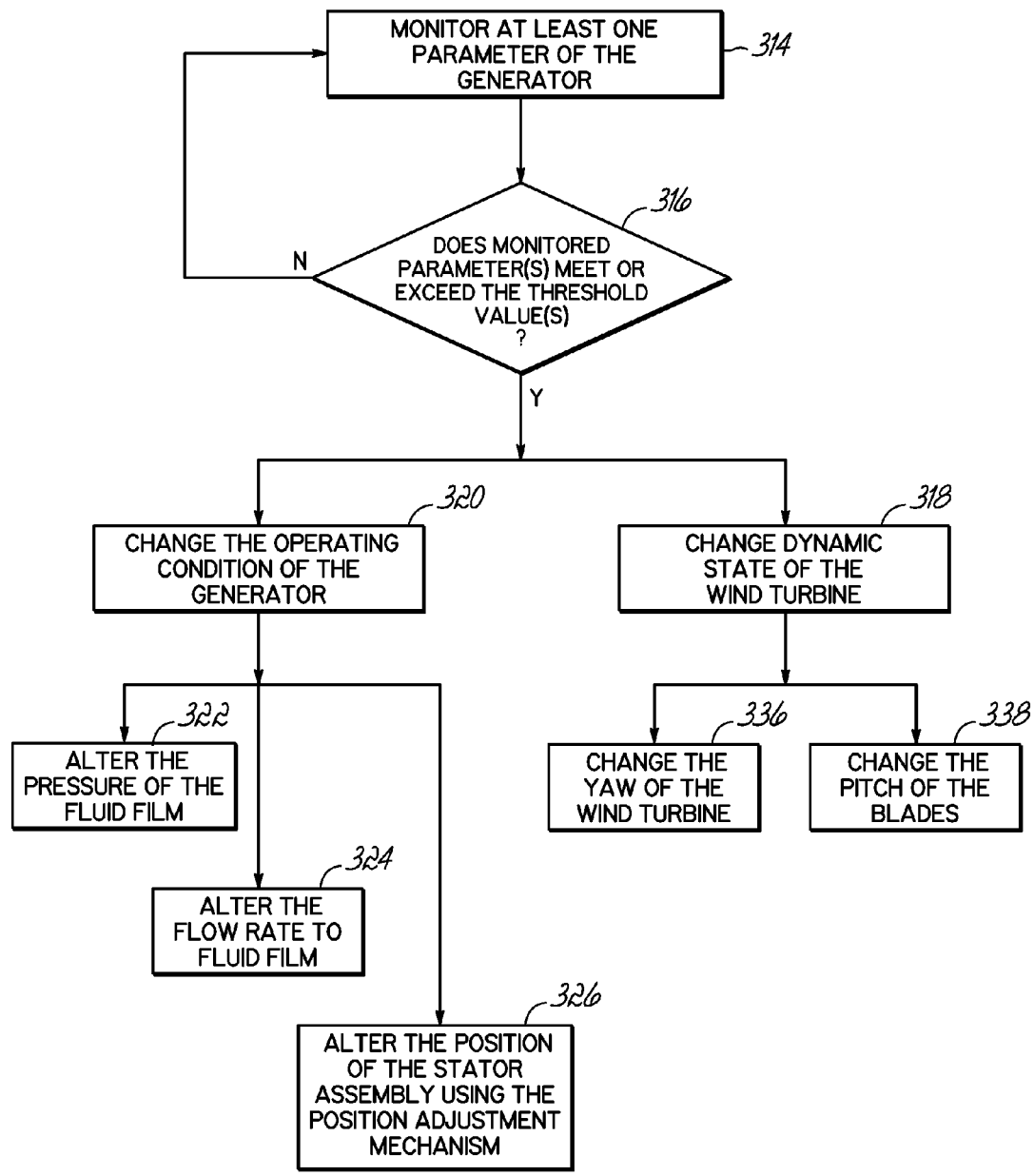
FIG. 12 illustrates an exemplary method for controlling a wind turbine having a generator in accordance with embodiments of the invention.

There are a host of control strategies that may be used with generator 18. FIG. 12 illustrates an exemplary method in accordance with one embodiment configured to control the generator 18 so as to maintain the air gap 204 at a substantially constant value. The wind turbine 10 includes a controller 312 operatively coupled to the generator 18 for controlling operation of the generator 18 and/or possibly the wind turbine 10 based on certain conditions in the generator 18. The controller 312 may be a local controller associated with the generator 18, or a global controller associated with the overall operation of the wind turbine 10. In an exemplary embodiment, when potentially undesirable conditions exist in the generator 18 (e.g., the air gap 204 is nearing the bounds of its allowable tolerance band), the controller 312 may be configured to modify a feature or characteristic of the generator 18 itself, and additionally or alternatively, change the dynamic state of the wind turbine 10. In this way, operation of the generator 18 with a consistent air gap 204 may be maintained. Each of these options is discussed in more detail below.

In accordance with an aspect of the invention, and in reference to FIG. 12, the controller 312 may monitor one or more parameters associated with operation of the generator 18, as in step 314. In an exemplary embodiment, the monitored parameter(s) may generally be indicative of the loads applied to generator 18 via the rotor assembly 34 and/or indicative of the air gap 204 between the stator and rotor assemblies 32, 34. The monitored parameter(s) may then be compared to a threshold value(s)/criteria stored in controller 312, as in step 316. If the monitored parameter(s) is less than the threshold value(s) stored in controller 312, then the generator 18 may continue to operate without intervention from this particular control system. If, on the other hand, the monitored parameter(s) meet or exceed the threshold value(s), then the controller 312 may be configured to alter the operation of the wind turbine 10 so as to reduce the loads on the generator 18, as at 318, or change the operating condition of the generator 18 so as to more readily accommodate the loads being applied thereto, as at 320.

In regard to changing the operation of the generator 18, there may be several ways to alter operation of the generator so as to maintain the air gap 204. For example, in one embodiment, the pressure of the fluid film 202 may be increased or decreased by respectively increasing or decreasing the pressure supplied by pump 232, as at 322. Additionally or alternatively, the flow rate of fluid through the pads 200, for example, may be changed to maintain the air gap 204, as at 324. Still further, the position of the stator assembly 32 may be varied to maintain the air gap 204, as at 326. In this regard, one or more stator segments 70 may be configured to change position in the manner described above so as to maintain the air gap 204.

In one embodiment, the monitored parameter(s) may be associated with the fluid film 202. In this regard, one or more sensors may be in communication with the fluid film 202 between the stator and rotor assemblies 32, 34 for monitoring at least one property thereof and further operatively coupled to the controller 312 for transmitting the data from the sensors to the controller. In one embodiment, the property of the fluid film being monitored by the sensors is the pressure. In this regard, the sensors may be pressure transducers capable of measuring the pressure of the fluid film 202. Such pressure transducers are generally known in the art and are commercially available. Thus, a detailed description of the pressure transducers is considered unnecessary. The pressure transducers are operatively coupled to the controller 312 and are configured to send a pressure signal indicative of the pressure of the fluid film 202.

In another embodiment, the property of the fluid film 202 being monitored by the sensors is the thickness of fluid film 202. In this regard, the sensors may be film thickness sensors or proximity sensors capable of measuring or indicating the thickness of the fluid film 202. For example and without limitation, the film thickness sensors may operate on an inductive or capacitive theory (e.g., proximity sensors). Such sensors are generally known in the art and are commercially available. Thus, a detailed description of the types of sensors is considered unnecessary. Other sensors operating on a host of other principles or theories may also be used. The proximity sensors are operatively coupled to the controller 312 and are configured to send a signal indicative of the film thickness. The film thickness may be correlated to the air gap 204. Alternatively, the sensors may monitor the air gap width directly as opposed via the fluid film 202.

Additionally or alternatively, the monitored parameter(s) may be associated with the position adjustment mechanisms 78. In this regard, one or more sensors may be in communication with the position adjustment mechanisms 78 for monitoring at least one parameter thereof, and further operatively coupled to the controller 312 for transmitting the data from the sensors to the controller 312. For example, sensors may be configured to monitor the fluid pressure being supplied to the actuators 178. This pressure may be correlated to the actual loads on the stator assembly 32. The sensors may also be position or proximity sensors for indicating the position of the pads 200, the extension of the actuator 178, or other information. In this embodiment, the control strategy is a typical feedback type of system that uses the data collected from these sensors and then alters the generator 18 in a manner that maintains the air gap 204 at a consistent value.

As noted in FIG. 12, the control strategy may also be configured to change the dynamic state of the wind turbine 10, if necessary. In other words, if the wind turbine 10 is operating at a state that makes it difficult to maintain the air gap 204 in a consistent manner, the operating state may be changed to an alternative operating state that does allow the air gap 204 to be maintained more consistently. While it may be expected that in most cases changes to the operation of the generator 18 will be sufficient to accommodate the loads on generator 18, altering the operation of the wind turbine 10 offers another avenue for the control strategy.

Again, there are a couple of options in regard to changing the operation or dynamic state of the wind turbine 10. To this end, the controller 312 may be operatively coupled to one or more sub-systems (having controllers which may be separate or integrated within controller 312) effective to alter the dynamic state of the wind turbine 10. By way of example and without limitation, the controller 312 may be operatively coupled to a yaw controller (not shown) for controlling the yaw of the rotor 16 about tower 12 and/or a pitch controller (not shown) for controlling the pitch of the blades 22 relative to the wind direction. Thus, in one embodiment, the controller 312 may be configured to yaw the rotor 16 relative to the tower 12 so as to turn the rotor 16 out of the wind, as at 336. Additionally or alternatively, the controller 312 may be configured to pitch the rotor blades 22 out of the wind so as to reduce the driving force of the rotor 16, as at 338. Through the manipulation of these sub-systems, the dynamic state of the wind turbine 10 may be altered so as to operate at a state where the air gap 204 may be more consistently maintained. It should be recognized that the sub-systems provided above are exemplary and those of ordinary skill in the art may recognize other sub-systems that affect the dynamic state of the wind turbine 10 which may be used in this control strategy.

Figure 13:
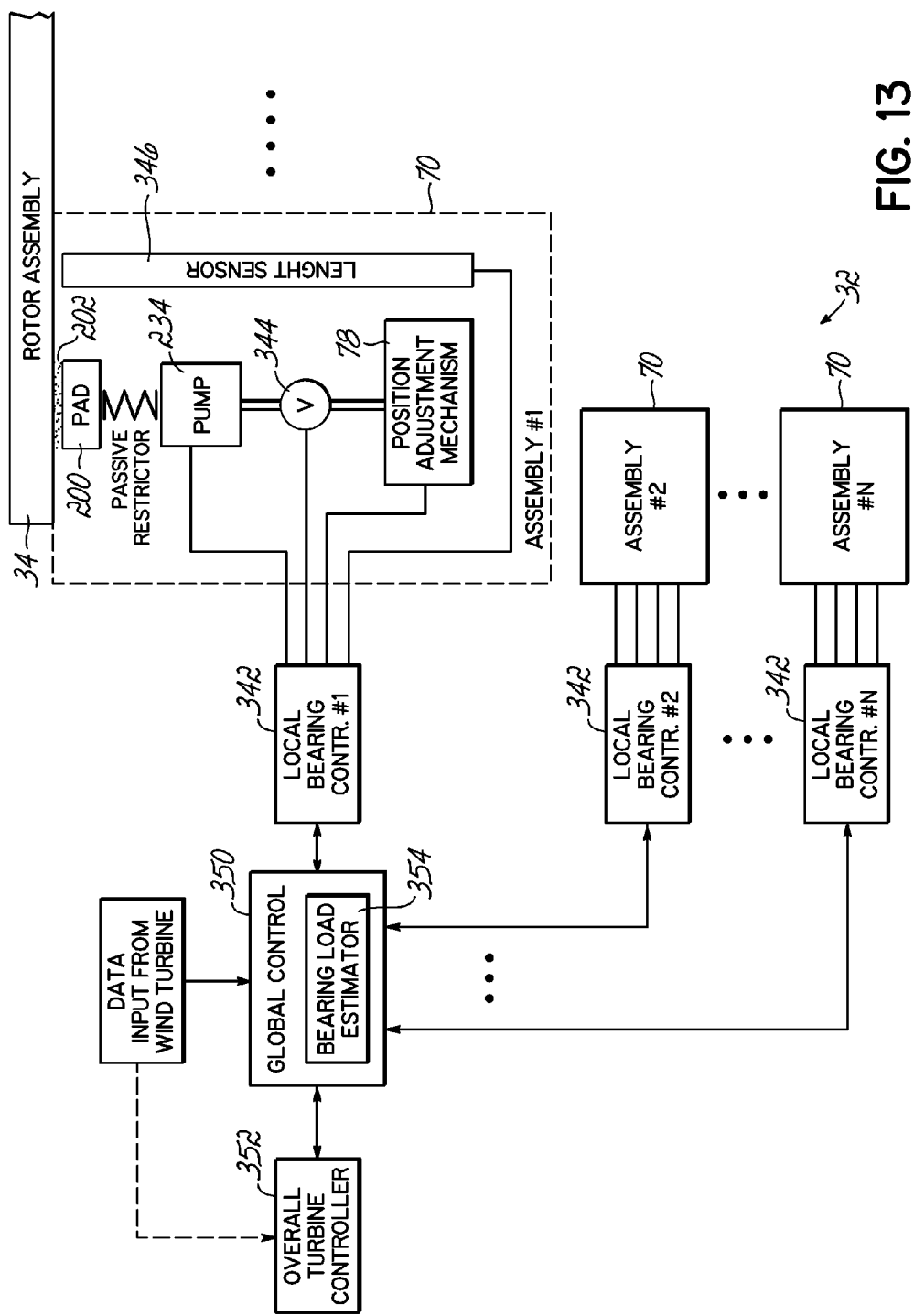
FIG. 13 is a control system in accordance with an embodiment of the invention for operating the wind turbine.

FIG. 13 illustrates another exemplary controller/control strategy for controlling the operation of the generator 18 in accordance with an aspect of the invention. Unlike the previous embodiment, which was based on a conventional feedback control theory, this embodiment implements a feed forward control theory. The stator assembly 32, rotor assembly 34, and fluid film 202 are shown schematically. As described above, the stator assembly 32 includes a plurality of stator segments 70 each having at least one position adjustment mechanism 78 associated therewith. One or more pads 200 may be associated with each position adjustment mechanism 78. For sake of simplicity and discussion, the figure schematically shows only one stator segment 70, one position adjustment mechanism 78, and one pad 200. Those having ordinary skill in the art will understand how to apply the methodology described herein to more complex systems having multiple stator segments 70, multiple position adjustment mechanisms 78, and multiple pads 200.

Each position adjustment mechanism 78 includes a local controller 342 for controlling certain aspects of the hydrostatic bearing and the position adjustment mechanism 78. In this regard, the local controller 342 may be operatively coupled to the high pressure pump 232, which in turn is operatively coupled to a fluid supply or reservoir 234 (FIG. 10). The high pressure pump 232 is operatively coupled to the pad 200 via one or more passive flow restrictors for regulating the flow to the pads. Additionally, the high pressure pump 232 may be operatively coupled to the position adjustment mechanism 78 through, for example, a control valve 344, which may in turn be operatively coupled to the local controller 342. While in this embodiment, the same high pressure pump 232 supplies fluid to both the pad 200 and the position adjustment mechanism 78, in an alternative embodiment, each of these may include its own dedicated pump operatively coupled to the local controller 342.

The generator 18 may include a number of sensors for sensing certain operating parameters of the generator 18, and the bearing mechanism 76 more particularly. In this regard, a pressure sensor may be in communication with the fluid film 202 or may be operatively coupled to the high pressure pump 232 for generally indicating the pressure of the fluid film 202 to the local controller 342. A pressure sensor may also be operatively coupled to the position adjustment mechanism 78, such as operatively coupled to actuator 178, for generally indicating the load being supported by the position adjustment mechanism 78 and transmitting that data to the local controller 342. Moreover, the position adjustment mechanism 78 may also include a length or position sensor 346, for generally indicating an overall extension length or position of the position adjustment mechanism 78, such as actuator 178, and transmitting that data to the local controller 342. Furthermore, the high pressure pump 232 may include a flow meter, as are generally known in the art, for indicating the flow of fluid to the pad 200 and transmitting that data to the local controller 342.

Each of the local controllers 342 may be operatively coupled to a global controller 350 which may be configured to coordinate all the local controllers 342. In this regard, the information or data from each of the local controllers 342 may be passed to the global controller 350. This may include, for example, an actual bearing position, pressure and flow rate data, and temperature data. The global controller 350 may, in turn, be operatively coupled to the main wind turbine controller, schematically shown at 352. The global controller 350 monitors the actual wind turbine operating conditions. This information may come from one or more sensors (not shown) operatively coupled to the global controller 350, or come from the main wind turbine controller 352, which is operatively coupled with such sensors. The actual wind turbine operating conditions may include the wind speed, rotor speed, blade pitch, generated power, etc. This data may also include additional data on the surrounding environment including ambient temperature and pressure, barometric pressure, etc.

The global controller 350 includes a bearing load estimator, schematically shown at 354, configured to estimate the total loads acting on the generator 18 via the rotor 16 and formulates a desired state of the generator 18 that accommodates the estimated loads. The bearing load estimator 354 is based on the theory that the load on the generator 18 may be determined to a large degree based on certain measurable data, including that provided above. Based on this data then, the bearing load estimator 354 can determine a set point for the generator 18 that best accommodates the anticipated loads. This set point data may include bearing pressures, flow rates, and desired bearing positions.

Of course, this set point data can be specific to the particular position in the generator 18. For example, the set point data for a pad 200 on one stator segment 70 may differ from the set point data of another pad 200 on another stator segment 70. Thus, the bearing load estimator 354 is configured to provide localized set point data. The bearing load estimator 354 may include, for example, a look-up table, giving set point data for various combinations of input data. Alternatively, theoretical models may be implements to arrive at the set point data based on various combinations of input data. The set point data from bearing load estimator 354 may be fed forward to the local controllers 342 for controlling the position adjustment mechanisms 78 and bearings to correspond to the set point data.

In addition to the feed forward aspect described above, the control system may also include the conventional feedback systems as described above in FIG. 12. In other words, the ultimate response of the generator 18 to the loading may be determined by the set point data in combination with any modification from the conventional feedback. It is believed that the modifications from the conventional feedback may be relatively small since the set point data is designed to place the generator 18 in a state intended to accommodate the loading thereon.

Figure 14:
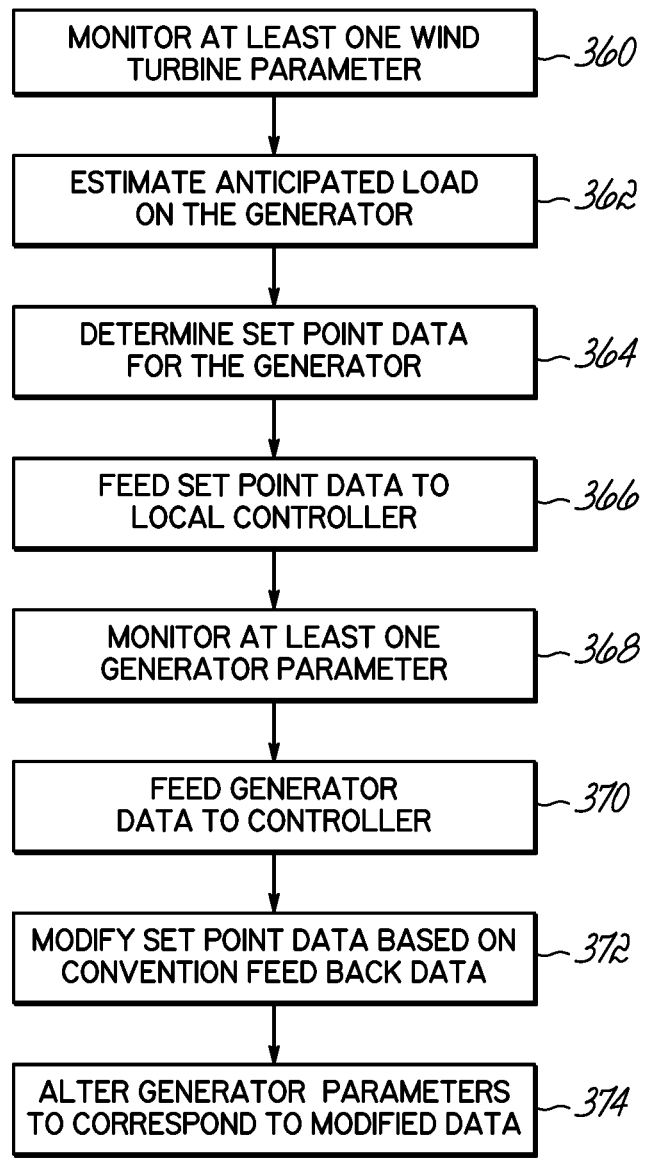
FIG. 14 illustrates another exemplary method for controlling a wind turbine having a generator in accordance with embodiments of the invention.

FIG. 14 illustrates an exemplary method of operating a wind turbine 10 in accordance with that described above. In this method, the system monitors one or more parameters of the wind turbine data, as at 360. Based on this information, the system estimates the anticipated load on the generator set point data for the generator, as at 362. The system then determines set point data configured to accommodate the anticipated load, as at 364. The system then feeds that data to local controllers associated with the generator 18, as at 366. Local data associated with the operation of the generator 18 is monitored, as at 368, and that data is feed to the local controllers associated with the generator 18, as at 370. That data may also be fed back to the global controller 350. The set point data is then modified based on the feedback data, as at 372. The generator parameters are then modified to correspond to the modified data, as at 374.

While two exemplary control strategies have been discussed above, aspects of the invention should not be limited to only those disclosed herein, as there may well be other strategies which can be used with generator 18 to more consistently maintain the air gap 204. The ability to essentially control the air gap 204 through, for example, the dual feature of the position adjustment mechanism 78 opens the door to a whole host of strategies, whether that is a conventional feedback control system, a feed forward control system, a combination of the two, or other control strategies.

The generator 18 as described herein provides a number of advantages as compared to conventional generator designs. For example, the fluid film 202 of the plain hydrostatic bearing overcomes many of the disadvantages of roller element bearings used in conventional designs. For one, plain bearings have the capability of scaling upwardly relatively well, and thus are particularly well-suited for providing a bearing assembly for large scale applications. Additionally, the use of a plain bearing also eliminates or significantly reduces one of the main sources of internal disturbances, i.e., those generated by the bearing assembly. The fluid film 202 is essentially self-adjusting and the imperfections of the bearing assembly due to, for example, manufacturing tolerances and the like do not appreciably affect the air gap 204.

The use of a fluid film bearing may provide additional improvements or design possibilities to wind turbine generator designs. For example, one consideration in generator designs is directed to effectively cooling the stator and rotor components of the generator. In this regard, many current designs use either air cooling of the stator winding and rotor magnets (e.g., less than about 1.5 MW direct drive wind turbines) or by water circulation through a water jacket on the stator. Both of these techniques essentially rely on heat conduction through the stator assembly and thus, are not particularly advantageous, especially as higher output wind turbines are desired.

Accordingly, in another aspect of the invention, the fluid that makes up the fluid film 202 may also be used as a coolant (e.g., a liquid coolant) for the generator 18. In this regard, the fluid that is pumped from pads 200 flows around the pads and into the interstitial spaces thereabout. This would include, for example, the air gap 204 between the stator segment envelope 74 and the rotor magnet envelope 254. Thus, the fluid will generally be present within the generator interior 380, e.g., between the support 30 and the rotor assembly 34, in some amount. Accordingly, in another aspect of the invention, this fluid may be used for direct liquid cooling of the heat-generating stator and rotor components. It is contemplated that direct liquid cooling is anywhere between 2-10 times more efficient than current cooling systems. Therefore, the use of plain bearings may provide a further advantage to the generator's cooling system.

In one embodiment, the generator interior 380 may be completely flooded with fluid. In an alternative embodiment, however, the generator interior 380 may be partially flooded with fluid. In the former embodiment, fluid substantially completely fills the interstitial spaces and heat may be removed from the heat generating components of the stator and rotor assemblies 32, 34 through convection heat transfer. The fluid may be circulated through a cooling system, shown schematically at 382. The cooling system 382 may include a pump 384 in communication with the generator interior 380 for circulating the fluid through a heat exchanger 386 configured to remove the heat from the fluid. Heat exchangers suitable for this application are generally known in the art and will not be discussed in detail. The pump 384 may be a dedicated pump for the cooling system 382. Alternatively, the pump 384 may be the pump 232 that supplies fluid to the pads 200. The cooling system 382 may include a controller, schematically shown at 388, for controlling the cooling system 382. In this regard, the controller 388 may be operatively coupled to the pump 384, as well as one or more sensors for determining the temperature of the fluid in the generator interior 380. For example, one or more temperature sensing devices 390, including without limitation thermocouples, and/or thermistors, may be in communication with the fluid and communicate the fluid temperature to the controller 388. The pump 384 may be controlled so as to vary the flow rate through the heat exchanger 386, and thereby control the temperature of the fluid. For example, the controller 388 may be configured to maintain the temperature of the fluid at a pre-determined set point temperature.

In the latter embodiment of a partially flooded generator interior 380, there may be a collection or pool of fluid at the lower end of the generator interior 380 due to gravity. Fluid that is dragged out of the pool due to, for example, rotation of the rotor assembly 34, or fluid that flows around the pads 200 (when not in the pool) flows or drains back down to the bottom of the generator interior 380 under the influence of gravity. This flow provides a cooling effect for the heat generating components of the stator and rotor assemblies 32, 34. Additionally, in regions that are not immersed in the fluid pool, the cooling system 382 may include one or more spray heads 392 for spraying the fluid on certain portions of the generator 18 (FIG. 9). For example, spray heads 392 may be positioned so as to spray fluid on the end turns of the coils that make up the stator segment envelope 74. Spray heads 392 may also be positioned to spray the fluid on components of the magnets that make up the rotor magnet envelope 254. The fluid from these spray heads 392 picks up heat from the components and drains back down to the bottom of the generator interior 380. The pump 384 of the cooling system 382 is in fluid communication with the pool of fluid in the bottom of the generator interior 380 and circulates the fluid through the heat exchanger 386 as directed by controller 388.

There are several reasons that make this type of cooling feasible in the instant direct drive wind turbine application. Keeping in mind that generators are typically high rpm machines, most designers would not think to use a generally high-viscosity fluid, such as oil, as a complete or partial flood coolant because of the viscous loses associated with its use. In other words, the drag associated with moving components through the oil bath would be so high as to outweigh any cooling benefit associated with such an oil bath. However, in direct drive applications, the dynamic aspects (e.g., rpms) of the generator are relatively small. Thus, it is expected that the losses due to drag will be significantly smaller. Accordingly, in this application, it is possible for one to gain the positive aspects of flood/partial flood cooling without significant negative effects from drag.

Additionally, one must be careful in placing a fluid in communication with both the stator and rotor assemblies 32, 34 of an electrical machine. In this regard, any fluid in communication with both assemblies 32, 34 should be a dielectric fluid. Fortuitously, the oils that are typically used as the fluid film in plain bearings are generally dielectric fluids. Thus, the same oil that constitutes the fluid film 202 and completely or partially floods the generator interior 380 also electrically isolates the two electrical components of the generator and thereby maintains proper operation.

It is believed that the cooling system 382 described above can significantly increase the cooling capability of the generator 18. The primary reason for this is that heat transfer is now based on forced convection, which is significantly more efficient at removing heat as compared to a conduction based cooling system. As a result, it is believed that the generator 18 may be operated at reduced temperatures, which, in turn, increases the production efficiency of the generator 18. The reduced operating temperatures afforded by the cooling system 382 as described above may provide additional benefits. For example, as a result of lower operating temperatures, it is believed that aluminum windings instead of copper windings can be used in the stator segment envelopes 74 and in the electromagnets when such are used. Aluminum windings are generally lighter and less costly, and thus more desirable in generator designs.

Another benefit in the generator 18 as described above is in the possible types of magnets which can be used. As discussed above, because of the relatively large air gaps required in current designs, permanent magnets are typically used in direct drive wind turbine designs. However, due to the ability to control the generator 18 so as to maintain a consistent air gap 204 which is much smaller than those attainable in current designs, other types of magnets may be used in the rotor assembly 34. In this regard, due to the smaller air gaps achievable in the current design, it is believed that electromagnets may be used in the rotor magnet envelope 254 to generate the magnetic fields. As such, the cost and supply issues associated with permanent magnets may be overcome. Additionally, because the cooling system 382 is configured to remove heat from the rotor assembly 34, as well as the stator assembly 32, the electromagnets may be operated at a temperature suitable for efficient energy production.

As noted above, aspects of the present design may allow the air gap 204 between the stator and rotor assemblies 32, 34 to be significantly reduced. This smaller air gap may allow increased magnetic coupling between the magnetic elements of the stator and rotor assemblies 32, 34 as compared to generators that rely solely on component rigidity to maintain generator air gap tolerances. Increased magnetic coupling between the rotor and stator may provide lower reluctance in the magnetic circuits passing through the generator coils, resulting in higher magnetic flux densities and corresponding increases in generator output. The smaller air gaps permitted by aspects of the present invention may thereby reduce the required design trade-offs between cost, power, and efficiency as compared to conventional generator designs.

Figure 15:
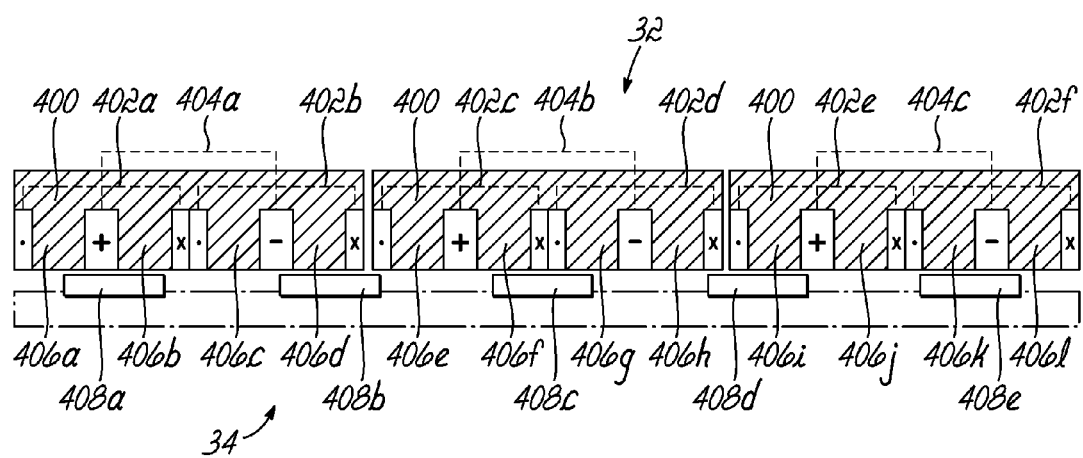
FIG. 15 a schematic view of an exemplary generator configuration in accordance with aspects of the invention.

Referring now to FIG. 15, an exemplary embodiment of a generator design that benefits from a reduced air gap includes stator assembly 32 and rotor assembly 34 illustrated in an unrolled or linear manner. The stator assembly 32 includes stator segment envelopes 74 with cores 400 composed of a material having a low reluctance such as laminated iron, AC phase windings 402a-402f, and DC field windings 404a-404c. The AC phase windings 402a-402f and DC field windings 404a-404c may be formed of a conductive material, such as copper or aluminum, and are located in channels or slots in the stator body 400. The AC phase windings 402a-402f and DC field windings 404a-404c are thereby comprised of an alternating pattern of conductors along the outer side of the stator segments 70. The slots define protruding regions, or teeth 406a-406l, of the stator core 400 that extend outwardly from the core 400 toward the rotor assembly 34. The DC field windings 404a-404c are configured so that an excitation current flowing through the field windings generates a magnetic flux. This flux is concentrated in the stator teeth 406a-406l and has alternating magnetic vectors along the length of the stator segments 70. The magnetic flux produced by the DC field windings 404a-404c cooperates with the moving rotor assembly 34 to establish an excitation field in the generator. The AC windings 402a-402f are located between the DC field windings 404a-404c so that the excitation field induces currents in the AC phase windings 402a-402f. In an embodiment of the invention, the AC phase windings 402a-402f may be configured to produce a 3-phase alternating current.

The rotor assembly 34 includes magnetic members 408a-408e formed of a material having a low reluctance, such as laminated iron, that are disposed adjacent to the stator assembly 32. In an alternative embodiment of the invention, the magnetic members 408a-408e may be permanent magnets, in which case the DC field windings 404a-404c may be omitted. In any case, the rotor assembly 34 is configured so that the magnetic members 408a-408e are separated from the stator assembly 32 by a radial clearance or air gap 204. As the rotor assembly 34 is rotated, the magnetic members 408a-408e move relative to the stator assembly 32 and pass through the alternating magnetic field lines generated by the DC field windings 404a-404c. Because the magnetic flux generated by the DC field windings 404a-404c follows the path offering the least magnetic reluctance, the flux in the vicinity of an AC phase winding 402a-402f will tend to follow a path through the magnetic member 408a-408e most tightly coupled to the adjacent stator teeth 406a-406l.

The AC phase windings 402a-402f and DC field windings 404a-404c are arranged so that each DC field winding circumscribes two stator teeth 406a-406l of two adjacent AC phase windings 402a-402f. Rotation of the rotor assembly 34 thus causes the magnetic members 408a-408e to move sequentially through the alternating magnetic field vectors produced by the stator assembly 32. As the magnetic members move, the magnetic field is coupled through the stator teeth 406a-406l by the magnetic members 408a-408e in alternating directions. The movement also causes the reluctance of the flux path passing through the AC phase windings 402a-402f to be modulated between maximum and minimum values so that the intensity of the magnetic flux is modulated. The resulting changes in the intensity and direction of the magnetic flux passing through the AC phase windings 402a-402f induces an alternating current therein. An alternating current is thereby generated in the AC phase windings 402a-402f by rotation of the rotor assembly 34. By properly configuring the stator core 400, rotor assembly 34, AC phase windings 402a-402f, and DC field windings 404a-404c, the flux variation produced at AC phase windings 402a-402f, and thus the induced currents, may be made time varying.

The intensity of the time varying magnetic flux, or excitation field, produced by the motion of the magnetic members 408a-408e past the stator teeth 406a-406l is inversely related to the reluctance of the magnetic circuit through which the flux is passing. Thus, the intensity of the excitation field has an inverse relationship to the distance between the magnetic members and the stator teeth. The reduced air gap width, provided by embodiments of the invention, may thereby allow the rotor assembly 34 to produce an excitation field having a sufficient intensity to generate electricity with lower excitation currents, fewer magnetic members, and/or magnetic members producing lower levels of magnetism than would normally be required by generators lacking the features of the present invention. In particular, a lower excitation current may reduce the amount of heat produced by the DC field windings, thereby lowering generator cooling requirements and increasing generator efficiency. Moreover, a lower excitation current requirement may also allow the cross-sectional area of the DC field windings to be reduced, lowering the weight and cost of the stator assembly 32.

It should be recognized that the configuration shown in FIG. 15 is merely illustrative of the different generator designs that may be possible due to the ability to consistently maintain a smaller air gap. It is believed that many generator configurations may now be possible that were previously out of reach for generator designs. Accordingly, aspects of the invention should not be limited to the configuration described above.

Aspects of the invention have been illustrated and described in conjunction with a wind turbine generator. However, aspects of the invention have a broader field of wind turbine applications. In many regards, aspects of the invention are directed to a bearing assembly that may be used in a host of wind turbine components or applications, one of which being a wind turbine generator. More specifically, aspects of the invention are directed to a bearing assembly having an inner member (e.g., inner bearing race), an outer member (e.g., outer bearing race) disposed relative to the inner member, and fluid film disposed between the inner and outer member. Like most bearing assemblies, the inner and outer members are configured to move relative to each other and the fluid film is configured to not only facilitate this relative movement, but to maintain a suitable separation of the components that allows substantially non-contact relative movement. The fluid film may be provided by a plain bearing, such as a hydrostatic bearing, having a recess or cavity in communication with a high pressure pump and fluid reservoir, as explained above. Unlike most bearing assemblies, however, the bearing assembly embodied herein includes a position adjustment mechanism configured to selectively move the plain bearing or move one of the inner or outer member to which the plain bearing is attached. As discussed above, the position adjustment mechanisms may include an active control aspect and a passive control aspect. The bearing assembly may include further attributes discussed above in the context of the generator. For example, one of the inner or outer members of the bearing assembly may have a segmented design, as described above. Additionally or alternatively, the bearing assembly may have a cooling system as described above.

By way of example and not limitation, a bearing assembly as described above may be used as a main bearing for a wind turbine. U.S. application Ser. No. 12/883,695, the disclosure of which is incorporated by reference herein in its entirety, discloses a main bearing, which may be in the form of a hydrostatic bearing. It is contemplated that certain aspects of the present invention, including for example, a segmented design, may be incorporated in that design to provide additional benefits to main bearing operation, and thus wind turbine operation. In this application, the inner member may include the main wind turbine shaft and the outer member may include a bearing housing or the like. The bearing housing may include a segmented design as disclosed herein and have position adjustment mechanisms with an active, and possibly a passive, aspect thereto. In a further example, the bearing assembly may include a blade bearing assembly.

U.S. application Ser. No. 12/987,596, the disclosure of which is incorporated herein by reference in its entirety, discloses a blade bearing in the form of a hydrostatic bearing. Likewise, it is contemplated that certain aspects of the present invention may be incorporated in that design to provide additional benefits to blade bearing operation. In this application, the inner member may include a portion of the hub and the outer member may include a portion of a blade (or vice versa). Either of these portions may include a segmented design having position adjustment mechanisms with an active and possibly a passive aspect thereto.

Thus, aspects of the invention may be viewed in the broader sense of a bearing assembly. The bearing assembly in the context of a generator design is but one exemplary implementation, wherein the stator assembly and rotor assembly of a generator is incorporated into the bearing assembly (i.e., the generator platform is built into or upon the bearing assembly). More particularly, the inner member is configured to include one of the stator or rotor assemblies and the outer member is configured to include the other of the stator or rotor assembly. The fluid film provides the air gap between the two assemblies. Thus, embodiments of the invention should not be limited to a wind turbine generator, but may include other wind turbine applications, such as main bearing assemblies, blade bearing assemblies, and possibly other applications.

The particular use or focus of aspects of the invention may vary depending on the particular application. By way of example, in the case of a generator, the focus may be primarily on maintaining a more consistent air gap, as was discussed above. For bearing assemblies, the focus may be on maintaining separation of the inner and outer members so as to avoid surface-to-surface contact under load. In other words, it may not be as important to maintain a constant film thickness, but to maintain separation of the two members. Aspects of the present invention may have an additional focus. In this regard, aspects of the present invention may be used to control resonance behavior of wind turbine components through structural damping. In this regard, many large dynamic systems are subject to vibrations and are characterized by a resonance frequency at which large amplitude oscillations occur. These resonance frequencies should generally be avoided, as they may result in significant damage or destruction of system.

In direct drive wind turbine applications, the generator is a relatively large dynamic system which may be characterized by a certain resonant frequency. This resonant frequency may be in a range of a few Hertz, and thus, within the operating range of the active aspect of the position adjustment mechanism(s). Thus, in accordance with another aspect of the present invention, the position adjustment mechanisms may be used to alter or counteract resonance behavior of the generator. In this regard, a controller, which may be a local or global controller, may be configured to monitor the vibratory status of the generator. This may be achieved, for example, by using one or more sensors (e.g., accelerometers or the like) located throughout the generator. The controller may be configured to determine if the system is moving toward resonant frequency. For example, the controller may monitor the growth in amplitude or monitor the frequency of the vibrations. If the amplitude grows to a certain threshold value, the amplitude growth rate reaches a threshold value, or the frequency nears a pre-determined threshold value (e.g., estimated resonant frequency), then the controller may be configured to take some countermeasures. By way of example, and without limitation, the countermeasures may include introducing an out-of-phase force that in essence dampens the growing resonant behavior. In this regard, the generator, and more particularly the position adjustment mechanisms, may be configured to operate as a dynamic damper to counteract resonant behavior. To this end, the controller may be configured to move one or more of the stator segments in a coordinated manner so as to introduce the out-of-phase forcing to the generator. The out-of-phase forcing is then configured to interact with the vibration so as to reduce or otherwise alter the vibration behavior of the system.

The use of aspects of the invention to control resonance through structural damping may also be incorporated into embodiments of the invention directed toward bearing assemblies. In this regard, aspects of the invention may be used to address low frequency resonance of various wind turbine components, including, for example, the blades. More particularly, it is known that wind turbine blades suffer from edgewise vibrations under load. These edgewise vibrations generally have low frequency characteristics. While various approaches have been attempted, edgewise vibrations generally do not have a good damping mechanism.

Aspects of the present invention may be used to address edgewise and possibly other vibrations in wind turbines. In this regard, a bearing assembly in accordance with aspects of the invention may be disposed between the blade/rotor and the tower. For example, the bearing assembly may be a blade bearing assembly or a main bearing assembly (e.g., when not a direct drive system). In these designs, when resonant behavior is sensed, the position adjustment mechanisms may be actuated in a coordinated manner so as to introduce an out-of-phase forcing into the blade/rotor that reduces or otherwise alters the resonance behavior of the system.

While the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of the general inventive concept.

What is claimed is:

1. A wind turbine component, comprising:
an inner member;
an outer member disposed relative to the inner member, the inner and outer members moving relative to each other, and one of the inner or outer members including a plurality of member segments each including:
a plain bearing coupled to the member segment and configured to provide a fluid film for maintaining separation of and facilitating relative movement between the inner and outer members, the plain bearing establishing an adjustable air gap between the member segment and the other of the inner or outer members, and
a position adjustment mechanism including an actuator coupled to the member segment for selectively moving the plain bearing; and
a position controller operatively coupled to the actuator of the position adjustment mechanism of at least one member segment and configured to:
monitor a parameter, and
actuate the actuator so that the position adjustment mechanism positions the plain bearing of the at least one member segment to control the adjustable air gap between the at least one member segment and the other of the inner or outer members based on the monitored parameter.

2. The wind turbine component according to claim 1, wherein each position adjustment mechanism is independently controlled by the position controller.

3. The wind turbine component according to claim 1, wherein the plain bearing includes a hydrostatic bearing having at least one cavity confronting the other of the inner or outer member and operatively coupled to a fluid supply and a pressure source for supplying a pressurized fluid that forms the fluid film between the inner and outer members.

4. The wind turbine component according to claim 1, further comprising:
a pressure source that provides pressurized fluid to the plain bearing; and
a pressure source controller operatively coupled to the pressure source for controlling the pressure of the fluid film provided by the plain bearing.

5. The wind turbine component according to claim 4, wherein the plain bearing includes a hydrostatic bearing having at least one cavity confronting the other of the inner or outer member and is operatively coupled to a fluid supply by the pressure source for supplying the pressurized fluid that forms the fluid film between the inner and outer members, and the pressure source controller is operatively coupled to the pressure source for controlling at least one of the pressure of the fluid film and a flow of fluid to the at least one cavity of the hydrostatic bearing.

6. The wind turbine component according to claim 1, wherein the position adjustment mechanism further comprises a passive member placed in series with the actuator.

7. The wind turbine component according to claim 6, wherein the passive member includes at least one of a spring, a bladder, or a rubber block.

8. The wind turbine component according to claim 6, wherein the passive member includes a damping element.

9. The wind turbine component according to claim 1, wherein the wind turbine component includes an interior space defined between the inner and outer members, the wind turbine component further including a cooling system, the cooling system comprising:
a liquid coolant at least partially filling the interior space and in open communication with at least one of the inner and outer members, the liquid coolant configured to absorb heat from the wind turbine component;
a pump in communication with the interior space; and
a heat exchanger in communication with the pump,
wherein the pump is configured to circulate the liquid coolant through the heat exchanger and thereby transfer the heat absorbed by the liquid coolant away from the wind turbine component.

10. The wind turbine component according to claim 9, wherein the liquid coolant partially fills the interior space, the cooling system further comprising at least one spray head for spraying the liquid coolant on a portion of the wind turbine component.

11. The wind turbine component according to claim 9, wherein the liquid coolant and the fluid that forms the fluid film are the same.

12. The wind turbine component according to claim 1 wherein the wind turbine component is a bearing assembly.

13. The wind turbine component according to claim 12, wherein the bearing assembly is configured as a main bearing assembly or a blade bearing assembly.

14. A wind turbine having a wind turbine component, the wind turbine component comprising:
an inner member;
an outer member disposed relative to the inner member, the inner and outer members moving relative to each other, and one of the inner or outer members including a plurality of member segments each including:
a plain bearing coupled to the member segment and configured to provide a fluid film for maintaining separation of and facilitating relative movement between the inner and outer members, the plain bearing establishing an adjustable air gap between the member segment and the other of the inner or outer members, and
a position adjustment mechanism including an actuator coupled to the member segment for selectively moving the plain bearing; and
a position controller operatively coupled to the actuator of the position adjustment mechanism of at least one member segment and configured to:
monitor a parameter, and
actuate the actuator so that the position adjustment mechanism positions the plain bearing of the at least one member segment to control the adjustable air gap between the at least one member segment and the other of the inner or outer members based on the monitored parameter.

15. The wind turbine component according to claim 1, wherein the wind turbine component includes a generator, the inner member includes one of a stator assembly or a rotor assembly of the generator, and the outer member includes the other of the stator assembly or the rotor assembly of the generator.

16. The wind turbine component according to claim 15, wherein the inner member includes the stator assembly and the outer member includes the rotor assembly.

17. The wind turbine component according to claim 15, wherein the plain bearing is coupled to the stator assembly.

18. The wind turbine component of claim 1, wherein the position controller actuates the actuator to maintain a consistent air gap between the member segment and the other of the inner or outer members.

* * * * *